(12) United States Patent
Wakita et al.

(10) Patent No.: US 9,822,019 B2
(45) Date of Patent: Nov. 21, 2017

(54) DESALINATION SYSTEM AND DESALINATION METHOD

(71) Applicant: PANASONIC CORPORATION, Osaka (JP)

(72) Inventors: Yumi Wakita, Nara (JP); Norihisa Mino, Osaka (JP); Hiroki Takeuchi, Osaka (JP); Mikiya Nakata, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 550 days.

(21) Appl. No.: 14/500,566

(22) Filed: Sep. 29, 2014

(65) Prior Publication Data
US 2015/0014146 A1 Jan. 15, 2015

Related U.S. Application Data

(63) Continuation of application No. PCT/JP2013/007569, filed on Dec. 25, 2013.

(30) Foreign Application Priority Data
Jan. 18, 2013 (JP) .................. 2013-007554

(51) Int. Cl.
*C02F 1/04* (2006.01)
*C02F 1/08* (2006.01)
(Continued)

(52) U.S. Cl.
CPC .............. *C02F 1/08* (2013.01); *B01D 1/0005* (2013.01); *B01D 1/0035* (2013.01);
(Continued)

(58) Field of Classification Search
CPC .. C02F 1/008; C02F 1/042; C02F 1/08; C02F 1/14; B01D 1/0005; B01D 1/0035;
(Continued)

(56) References Cited

U.S. PATENT DOCUMENTS 5,270,080 A  12/1993  Mino et al.
2008/0302715 A1*  12/2008  Venville ............... B01D 24/007
210/283
(Continued)

FOREIGN PATENT DOCUMENTS

CN  101267874 A  9/2008
CN  101739035 A  6/2010
(Continued)

OTHER PUBLICATIONS

International Search Report dated Feb. 4, 2014 issued in International Patent Application No. PCT/JP2013/007558.
(Continued)

*Primary Examiner* — Brian McCaig
(74) *Attorney, Agent, or Firm* — McDermott Will & Emery LLP

(57) ABSTRACT

A desalination system includes a water tank, a water-repellent particle layer located at a lower portion of the tank and composed of water-repellent particles, and a devolatilizing layer located below the water-repellent particle layer. Liquid is introduced to the tank, the introduced liquid is heated to be evaporated into water vapor, and the water vapor passes through the water-repellent particle layer and is liquefied at the devolatilizing layer, so that fresh water is obtained from the liquid. The desalination system further includes a liquid level controller for determining a level of the liquid introduced to the tank in accordance with information on relationship between information corresponding to an amount of the liquid introduced to the tank and a surface level of the liquid in the tank, and an introduced amount controller for adjusting the amount of the liquid introduced to the tank in accordance with the determined liquid surface level.

9 Claims, 25 Drawing Sheets

(51) Int. Cl.
   *C02F 1/14*      (2006.01)
   *B01D 1/00*      (2006.01)
   *B01D 5/00*      (2006.01)
   *C02F 1/00*      (2006.01)
   *C02F 101/12*    (2006.01)
   *C02F 103/08*    (2006.01)

(52) U.S. Cl.
   CPC ......... *B01D 1/0076* (2013.01); *B01D 1/0082* (2013.01); *B01D 5/006* (2013.01); *C02F 1/008* (2013.01); *C02F 1/042* (2013.01); *C02F 1/14* (2013.01); *C02F 2101/12* (2013.01); *C02F 2103/08* (2013.01); *C02F 2209/10* (2013.01); *C02F 2209/42* (2013.01); *C02F 2209/44* (2013.01); *Y02W 10/37* (2015.05)

(58) Field of Classification Search
   CPC .... B01D 1/0076; B01D 1/0082; B01D 5/006; Y02W 10/37
   See application file for complete search history.

(56) References Cited

U.S. PATENT DOCUMENTS

| | | |
|---|---|---|
| 2009/0090663 A1 | 4/2009 | Hirata et al. |
| 2012/0138448 A1 | 6/2012 | Mino et al. |

FOREIGN PATENT DOCUMENTS

| | | |
|---|---|---|
| JP | 60-13206 U | 1/1985 |
| JP | 07-63670 B2 | 7/1995 |
| JP | 11-216459 A | 8/1999 |
| JP | 2000-171592 A | 6/2000 |
| WO | 2012/060036 A1 | 5/2012 |

OTHER PUBLICATIONS

International Search Report dated Feb. 4, 2014 issued in International Patent Application No. PCT/JP2013/007569.
International Preliminary Report on Patentability dated Jul. 21, 2015 issued in International Patent Application No. PCT/JP2013/007569.
International Preliminary Report on Patentability dated Jun. 30, 2015 issued in International Patent Application No. PCT/JP2013/007558.
Chinese Office Action dated Jul. 7, 2016 issued in Chinese Patent Application No. 201380018339.8 (Partial English translation).
Non-final U.S. Office Action dated May 1, 2017 issued in U.S. Appl. No. 14/500,061.

\* cited by examiner

Fig.6

| NUMBER OF TIMES OF OPENING/CLOSING WATER GATE 101 (TIMES) | LEVEL OF LIQUID LAYER (cm) |
|---|---|
| 0 | 30 |
| 1 | 29 |
| 2 | 28.5 |
| 3 | 28 |
| . . . | |
| N | - |

Fig.7A

| ELAPSED TIME FROM FORMATION OF LIQUID LAYER 4 (DAYS) | LEVEL OF LIQUID LAYER (cm) |
|---|---|
| 1 | 30 |
| 2 | 30 |
| 3 | 29.5 |
| 4 | 29.5 |
| . . . | |
| N | - |

Fig. 10A

<BEFORE CHANGE>

| NUMBER OF TIMES OF OPENING/CLOSING WATER GATE 101 (TIMES) | LEVEL OF LIQUID LAYER (cm) |
|---|---|
| 0 | 30 |
| 1 | 29.5 |
| 2 | 29 |
| 3 | 28.5 |
| ... | ... |
| N | - |

<AFTER CHANGE>

| NUMBER OF TIMES OF OPENING/CLOSING WATER GATE 101 (TIMES) | LEVEL OF LIQUID LAYER (cm) |
|---|---|
| 0 | 30 |
| 1 | 29.8 |
| 2 | 29.6 |
| 3 | 29.4 |
| ... | ... |
| N | - |

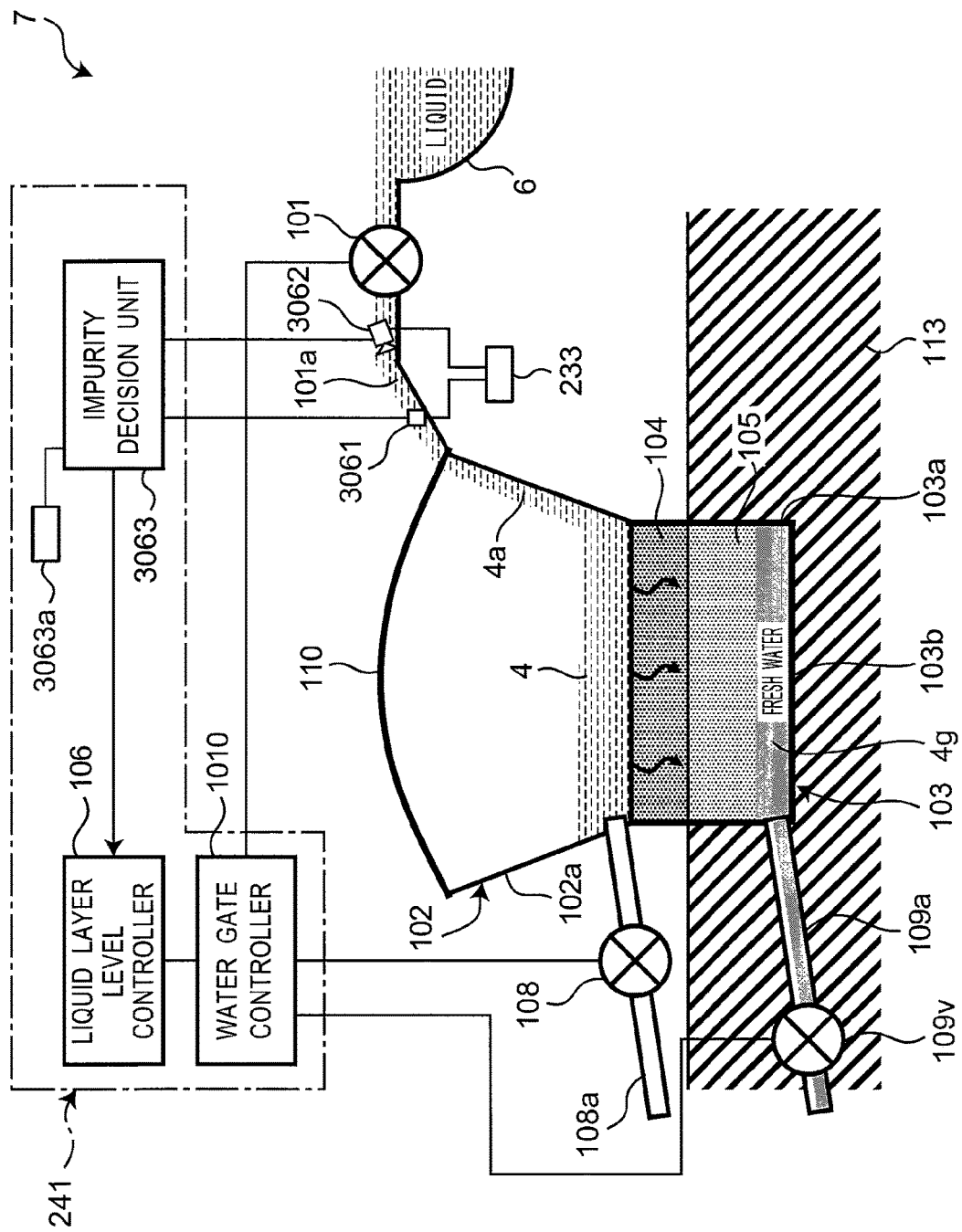

DESALINATION SYSTEM AND DESALINATION METHOD

CROSS-REFERENCE TO RELATED APPLICATIONS

This is a continuation application of International Application No. PCT/JP2013/007569, with an international filing date of Dec. 25, 2013, which claims priority of Japanese Patent Application No. 2013-007554 filed on Jan. 18, 2013, the content of which is incorporated herein by reference.

TECHNICAL FIELD

The technical field relates to a desalination system including water-repellent particles as well as to a desalination method.

BACKGROUND ART

Patent Literature 1 discloses a desalination system including water-repellent particles as well as a desalination method.

CITATION LIST

Patent Literature

[Patent Literature 1] WO 2012/060036 A

SUMMARY OF THE INVENTION

However, there is no disclosure of a specific configuration for actual desalination.

One non-limiting and exemplary embodiment provides a desalination system and a desalination method that enable efficient desalination.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A desalination system comprising:
 a water tank;
 a water-repellent particle layer located at a lower portion of the water tank and composed of water-repellent particles; and
 a devolatilizing layer located below the water-repellent particle layer, wherein
 liquid is introduced to the water tank,
 the introduced liquid is heated to be evaporated into water vapor, and
 the water vapor passes through the water-repellent particle layer and then, is liquefied at the devolatilizing layer to obtain fresh water from the liquid,
 the desalination system further comprises:
 a liquid level controller that determines a level of the liquid introduced to the water tank in accordance with information on relationship between information corresponding to an amount of the liquid introduced to the water tank and a surface level of the liquid in the water tank; and
 an introduced amount controller that adjusts the amount of the liquid introduced to the water tank in accordance with the determined surface level of the liquid.

These general and specific aspects may be implemented using a system, a method, and a computer program, and any combination of systems, methods, and computer programs.

According to this aspect of the present disclosure, the liquid level controller determines the level of the liquid to be introduced to the water tank in accordance with the information on the relationship between the information corresponding to the amount of the liquid introduced to the water tank and the surface level of the liquid in the water tank, and the introduced amount controller adjusts the liquid introduced to the water tank in accordance with the determined surface level of the liquid. It is thus possible to effectively prevent breakage of the water-repellent particle layer at a concave portion and efficiently and reliably perform automatic desalination.

BRIEF DESCRIPTION OF THE DRAWINGS

These and other aspects and features of the present disclosure will become clear from the following description taken in conjunction with the embodiments thereof with reference to the accompanying drawings, in which:

FIG. 6 is a tabular-form view exemplifying information on the relationship between the number of times of opening/closing a water gate and a level of a liquid layer in the desalination system according to the first embodiment;

FIG. 7A is a tabular-form view of information on the relationship between an elapsed time from formation of the liquid layer and a level of the liquid layer in the desalination system according to the first embodiment;

FIG. 10A is a tabular-form views exemplifying values before and after change of relationship information on a level of a liquid layer in accordance with a distance between a plurality of introduction paths used for introducing liquid to a water tank in a desalination system according to a second embodiment;

FIG. 14A is a view of a desalination system according to a third embodiment;

DETAILED DESCRIPTION

Figure 1:
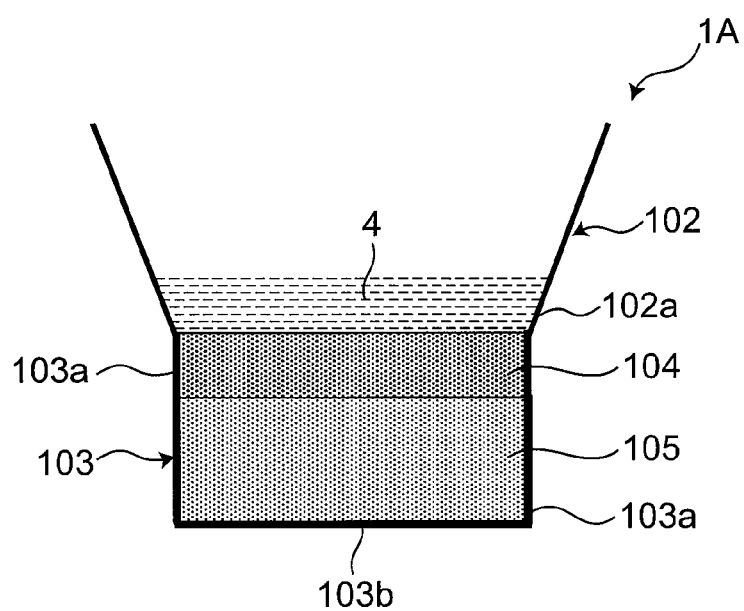
FIG. 1 is a sectional view showing a basic configuration of a desalination apparatus according to a first embodiment.

Before the description of the various embodiments proceeds, various approaches made by the inventors to accomplish the embodiments are explained.

Examples of the disclosed technique are as follows.

1st aspect: A desalination system comprising:
a water tank;
a water-repellent particle layer located at a lower portion of the water tank and composed of water-repellent particles; and
a devolatilizing layer located below the water-repellent particle layer, wherein liquid is introduced to the water tank,
the introduced liquid is heated to be evaporated into water vapor, and
the water vapor passes through the water-repellent particle layer and then, is liquefied at the devolatilizing layer to obtain fresh water from the liquid,
the desalination system further comprises:
a liquid level controller that determines a level of the liquid introduced to the water tank in accordance with information on relationship between information corresponding to an amount of the liquid introduced to the water tank and a surface level of the liquid in the water tank; and
an introduced amount controller that adjusts the amount of the liquid introduced to the water tank in accordance with the determined surface level of the liquid.

According to this aspect of the present disclosure, the liquid level controller determines the level of the liquid to be introduced to the water tank in accordance with the information on the relationship between the information corresponding to the amount of the liquid introduced to the water tank and the surface level of the liquid in the water tank, and the introduced amount controller adjusts the liquid introduced to the water tank in accordance with the determined surface level of the liquid. It is thus possible to effectively prevent breakage of the water-repellent particle layer at a concave portion and efficiently and reliably perform automatic desalination.

2nd aspect: The desalination system according to the 1st aspect, wherein
the information corresponding to the amount of the liquid introduced to the water tank is information corresponding to a number of times of introducing the liquid to the water tank, and in information on relationship between the information corresponding to the number of times and the surface level of the liquid in the water tank, the surface level of the liquid is decreased as the number of times of introducing the liquid is larger.

According to this aspect, it is possible to estimate the depth of the concave portion at the water-repellent particle layer in accordance with the number of times of introducing the liquid to the water tank. This configuration can reduce breakage of the water-repellent particle layer.

3rd aspect: The desalination system according to the 1st aspect, wherein
when an amount of the introduced liquid per unit time is constant while a water gate located on an introduction path used for introducing the liquid to the water tank is opened, the information corresponding to the amount of the liquid introduced to the water tank is an introduced amount estimated from the number of times of opening and closing the water gate and a period of opening the water gate.

According to this aspect, it is possible to estimate the depth of the concave portion at the water-repellent particle layer, which is formed by introduction of the liquid, in accordance with the number of times of introducing the liquid to the water tank. This configuration can reduce breakage of the water-repellent particle layer.

4th aspect: The desalination system according to the 1st aspect, wherein
the information corresponding to the amount of the liquid introduced to the water tank is information corresponding to an elapsed time from the introduction of the liquid, and in information on relationship between the information corresponding to the elapsed time and the surface level of the liquid in the water tank, the surface level of the liquid is decreased as the elapsed time from the introduction of the liquid is longer.

According to this aspect, it is possible to more easily estimate the depth of the concave portion at the water-repellent particle layer, which is formed by introduction of the liquid, in accordance with the elapsed time. This configuration can reduce breakage of the water-repellent particle layer.

5th aspect: The desalination system according to any one of the 1st to 4th aspects, wherein a level of the liquid in a case where a distance between adjacent introduction paths out of a plurality of introduction paths used for introducing the liquid to the water tank is equal to or less than a predetermined distance is smaller than a level of the liquid in a case where the distance between the adjacent introduction paths is more than the predetermined distance.

According to this aspect, it is possible to prevent the concave portion formed at the water-repellent particle layer due to overlapping of flows of the liquid introduced through the adjacent introduction paths from being deeper than the concave portion formed where flows of the liquid are not overlapped with each other. This configuration effectively can prevent likelihood of breakage of the water-repellent particle layer.

6th aspect: The desalination system according to any one of the 1st to 5th aspects, further comprising:

an impurity deposition information acquiring unit that acquires information on whether or not impurities are deposited from the liquid, wherein the liquid level controller comprises a decision unit that determines a level of the liquid so that a level of the liquid in the water tank in a case where the impurities are deposited is higher than a level of the liquid in a case where the impurities are not deposited, in accordance with the information from the impurity deposition information acquiring unit.

According to this aspect, when acquiring from the impurity deposition information acquiring unit the information that the impurities are deposited on the liquid or in the introduction path, the decision unit in the liquid level controller determines the level of the liquid introduced to the water tank in view of the acquired information on whether or not the impurities are deposited, in accordance with the information on the relationship between the information corresponding to the amount of the liquid introduced to the water tank and the surface level of the liquid in the water tank, and the introduced amount controller adjusts the liquid introduced to the water tank in accordance with the determined surface level of the liquid. It is thus possible to effectively prevent breakage of the water-repellent particle layer at the concave portion and more efficiently and more reliably perform automatic desalination.

7th aspect: The desalination system according to the 6th aspect, wherein the impurity deposition information acquiring unit comprises:

an imaging unit that captures an image of a surface of the water-repellent particle layer in the liquid and outputs the captured image associated with time; and an impurity decision unit that decides whether or not the impurities are deposited from the liquid in accordance with the image captured and outputted from the imaging unit.

8th aspect: The desalination system according to the 6th aspect, wherein the impurity deposition information acquiring unit is configured to acquire information on whether or not impurities are deposited in the introduction path used for introducing the liquid to the water tank, and the decision unit is configured to adjust, when acquiring information from the impurity deposition information acquiring unit that the impurities are deposited, a level of the liquid in the water tank so as to be higher than a level of the liquid in a case where the impurities are not deposited.

According to this aspect, it is possible to estimate the depth of the concave portion at the water-repellent particle layer, which is formed by introduction of the liquid, in accordance with an actual environment in view of the fact that the water-repellent particles moving by introduction of the liquid vary in amount depending on deposition of impurities. This configuration can reduce breakage of the water-repellent particle layer.

9th aspect: The desalination system according to the 8th aspect, wherein the impurity deposition information acquiring unit comprises:

a concentration measuring unit that measures concentration of the impurities in the liquid flowing in the introduction path and outputs, to the impurity deposition information acquiring unit, the measured concentration of the impurities associated with time; and an impurity decision unit that decides whether or not the impurities are deposited from the liquid in accordance with the concentration of the impurities as outputted from the concentration measuring unit.

According to this aspect, it is possible to estimate the depth of the concave portion at the water-repellent particle layer, which is formed by introduction of the liquid, in accordance with an actual environment in view of the fact that deposition of the impurities in the introduction path decreases the flow of the liquid introduced to the water tank. This configuration can reduce breakage of the water-repellent particle layer.

10th aspect: The desalination system according to the 8th aspect, wherein the impurity deposition information acquiring unit comprises:

an imaging unit that captures an image of the liquid flowing in the introduction path and outputs, to the impurity deposition information acquiring unit, the captured image of the liquid associated with time; and an impurity decision unit that decides whether or not the impurities are deposited from the liquid in accordance with the image of the liquid as outputted from the imaging unit.

11th aspect: A liquid amount adjusting apparatus included in a desalination system comprising:

a water tank for containing liquid;

a water-repellent particle layer located at a lower portion of the water tank and composed of water-repellent particles; and a devolatilizing layer located below the water-repellent particle layer, the liquid adjusting apparatus comprising:

a liquid level determining unit that determines a level of the liquid introduced to the water tank in accordance with information on relationship between information corresponding to an amount of the liquid introduced to the water tank and a surface level of the liquid in the water tank; and an introduced amount controller that adjusts the amount of the liquid introduced to the water tank in accordance with the determined surface level of the liquid.

12th aspect: A desalination method for obtaining fresh water from liquid using a desalination apparatus comprising:

a water tank for containing liquid;

a water-repellent particle layer located at a lower portion of the water tank and composed of water-repellent particles; and a devolatilizing layer located below the water-repellent particle layer, the method comprising steps of:

determining, by a liquid level controller, a surface level of the liquid introduced to the water tank in accordance with information on relationship between information corresponding to an amount of the liquid introduced to the water tank and a surface level of the liquid in the water tank; and adjusting, by an introduced amount controller, the amount of the liquid introduced to the water tank and then, placing a liquid on the water-repellent particle layer so as to be equal in level to the determined surface level of the liquid.

According to this aspect of the present disclosure, the liquid level controller determines the level of the liquid to be introduced to the water tank in accordance with the information on the relationship between the information corresponding to the amount of the liquid introduced to the water tank and the surface level of the liquid in the water tank, and the introduced amount controller adjusts the liquid introduced to the water tank in accordance with the determined surface level of the liquid. It is thus possible to effectively prevent breakage of the water-repellent particle layer at a concave portion and efficiently and reliably perform automatic desalination.

13th aspect: The desalination method according to the 12th aspect, further comprising steps of:

heating to evaporate the contained liquid into water vapor; and obtaining fresh water from the liquid by causing the water vapor to pass through the water-repellent particle layer, then reach the devolatilizing layer and be liquefied.

A first embodiment of the present disclosure is described in detail below with reference to the drawings.

Definition of Terms

The term "water repellency" means the property of repelling water in this description.

First Embodiment

In order to describe a desalination apparatus 1 according to the first embodiment with reference to the drawings, initially described is a desalination apparatus 1A that basically functions similarly to the desalination apparatus 1. FIG. 1 is a sectional view of the desalination apparatus 1A according to the first embodiment.

The desalination apparatus 1A shown in FIG. 1 includes a water tank 102, a water-repellent particle layer 104, and a devolatilizing layer 105. The water tank 102, the water-repellent particle layer 104, and the devolatilizing layer 105 are disposed in the mentioned order from the top to the bottom.

<Water Tank 102>

The water tank 102 can have any shape in a planar view, such as a rectangular shape or a circular shape. The water tank 102 has an upper side wall 102a that surrounds the entire side surface of the water tank 102.

There can be provided a container 103 so as to surround the side surface of the water tank 102, the side surface of the water-repellent particle layer 104 to be described later, and the side surface and the bottom surface of the devolatilizing layer 105 to be described later.

The container 103 shown in FIG. 1 has a lower side wall 103a stood vertically, the upper side wall 102a that is connected to the lower side wall 103 and is slanted so as to expand upward, and a bottom plate 103b that is connected to the lower side wall 103.

The container 103 is formed such that surfaces other than the top surface thereof are surrounded with the upper side wall 102a, the lower side wall 103, and the bottom plate 103b. At a lower portion of the water tank 102, the lower side wall 103a surrounds the entire side portions of the water-repellent particle layer 104 and the devolatilizing layer 105 to be described later and the bottom plate 103b holds the bottom surface of the devolatilizing layer 105. The container 103 is capable of reserving desalinated fresh water 4g in the devolatilizing layer 105.

The lower side wall 103a and the upper side wall 102a are each made of a water-repellent material. Examples of the lower side wall 103a and the upper side wall 102a include metal plate concrete, a waterproof sheet, clay, and the like.

Liquid poured into the water tank 102 forms a liquid layer (liquid) 4 on the top surface of the water-repellent particle layer 104 and in (in the space surrounded with the upper side wall 102a) the water tank 102.

The water tank 102 can optionally have an introduction path 101a that is used for introducing liquid to the water tank 102. If the water tank 102 has no introduction path 101a, liquid is introduced to the water tank 102 from an opening provided at the top of the water tank 102. Such liquid is transparent, translucent, or the like so that particle measurement is enabled as to be described later.

The water-repellent particle layer 104 and the upper side wall 102a have water repellency, so that liquid poured into the water tank 102 does not flow into the devolatilizing layer 105. The liquid poured into the water tank 102 is provided and kept as the liquid layer 4 on the water-repellent particle layer 104 that is surrounded with the upper side wall 102a. The liquid layer 4 is 15 to 50 cm in level (the surface level of the liquid layer 4), for example. If the liquid layer 4 is too high (e.g. higher than 15 cm), it takes more time to heat liquid, large heat capacity is necessary, and liquid desalination efficiency thus deteriorates, as to be described later. In contrast, if the liquid layer 4 is too low (e.g. lower than 50 cm), liquid desalination efficiency is too low. It is possible to keep preferred desalination efficiency within the above numerical range.

Figure 5A:
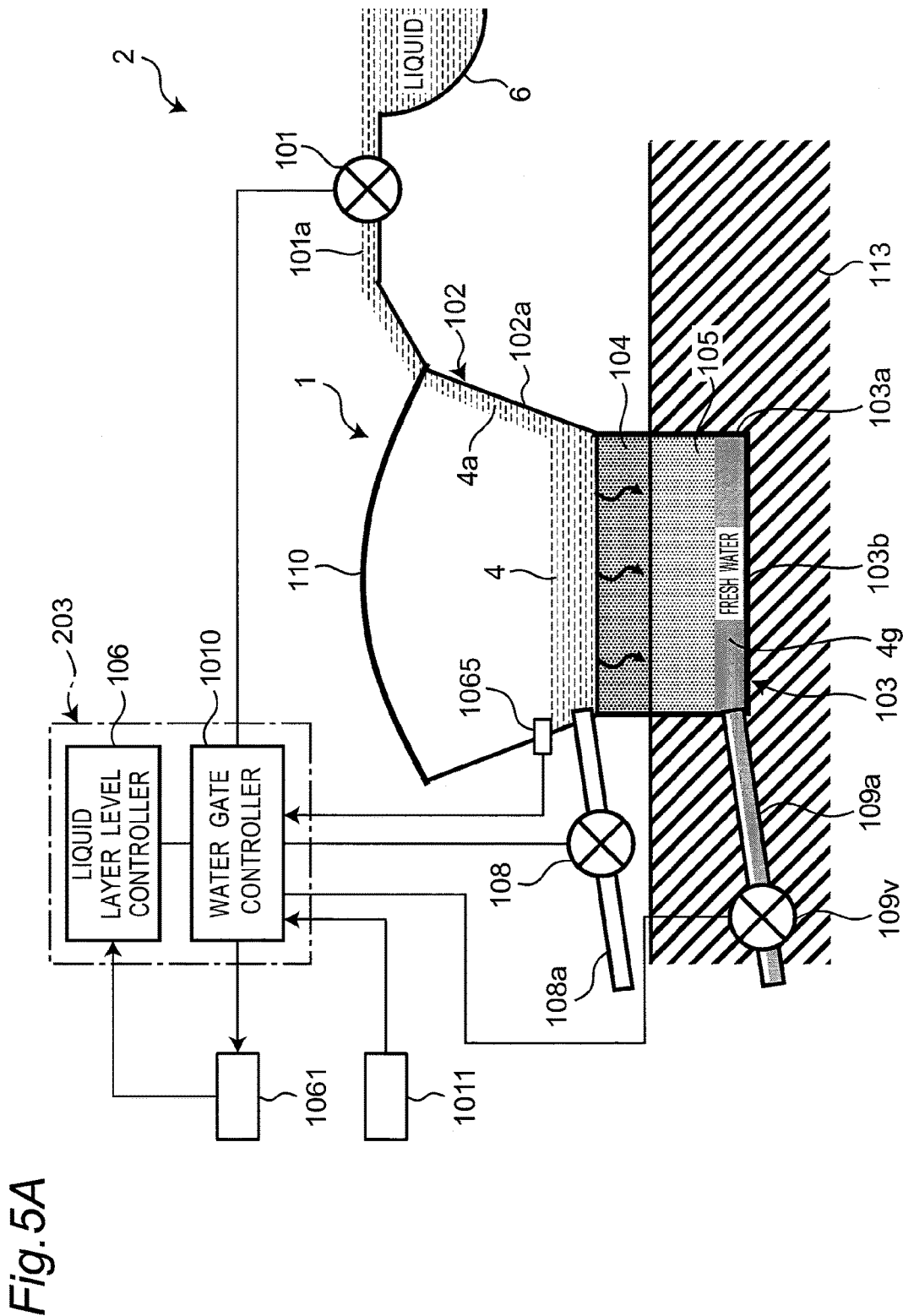
FIG. 5A is a partially sectional explanatory view of a desalination system according to the first embodiment.

The introduction path 101a can optionally have a water gate 101 for adjusting liquid introduced to the water tank 102 through the introduction path 101a (see FIG. 5A). The water gate 101 adjusts a flow rate of liquid that is provided between the water tank 102 and an external tank 6 reserving the liquid. Examples of the external tank 6 include the sea, a preprocessing tank reserving seawater introduced from the sea, and a tank reserving salt water that is supplied separately.

When the water gate 101 is opened, the liquid is introduced from the external tank 6 to the water tank 102 through the introduction path 101a. Closing the water gate 101 stops introduction of the liquid from the external tank 6 to the water tank 102 through the introduction path 101a. A water gate controller 1010 functioning as an example of an introduced amount controller controls opening/closing of the water gate 101.

The water gate controller 1010 can optionally control opening/closing of the water gate 101 in accordance with information inputted by a user or the like using an input unit 1011. Examples of the input unit 1011 include a touch panel, a keyboard, a cursor, and a microphone. Information inputted by a user or the like using the input unit 1011 relates to opening or closing of the water gate 101.

The water tank 102 can optionally have a heater for heating the liquid layer 4 in the water tank 102. For example, the heater is located on the upper side wall 102a of the water tank 102.

<Water-Repellent Particle Layer 104>

The water-repellent particle layer 104 is located at the lower portion of the water tank 102.

The water-repellent particle layer 104 is composed of at least a plurality of water-repellent particles, normally a large number of water-repellent particles. Such a large number of water-repellent particles are closely located to form the water-repellent particle layer 104. More specifically, the surface of a water-repellent particle is in contact with surfaces of a plurality of other water-repellent particles. The water-repellent particles in contact with each other in the water-repellent particle layer 104 form gaps therebetween which allow water vapor formed by heating and evaporating liquid to path through.

The water-repellent particle layer 104 composed of the water-repellent particles is capable of decreasing entrance of liquid into the inside of the water-repellent particle layer 104. The entire side surface of the water-repellent particle layer 104 can be surrounded with the lower side wall 103a. When the water-repellent particle layer 104 is surrounded with the lower side wall 103a, liquid can be prevented from entering the inside of the water-repellent particle layer 104.

Each water-repellent particle includes a particle and a water-repellent film coating the surface of the particle.

Examples of such a particle include gravel, sand, silt, and clay. The gravel is a particle having a diameter larger than 2 mm and equal to or less than 75 mm. The sand is a particle having a diameter larger than 0.075 mm and equal to or less than 2 mm. The silt is a particle having a diameter larger than 0.005 mm and equal to or less than 0.075 mm. The clay is a particle having a diameter of 0.005 mm or less.

A water-repellent film coats the surface of each particle. The water-repellent film preferably includes a fluorocarbon group expressed by the chemical formula —$(CF_2)_n$—. In this formula, n denotes a natural number. The preferred range of n is 2 or more as well as 20 or less.

The water-repellent film is preferably bonded with the particle by means of covalent bonding. The following chemical formula (I) expresses a preferred water-repellent film.

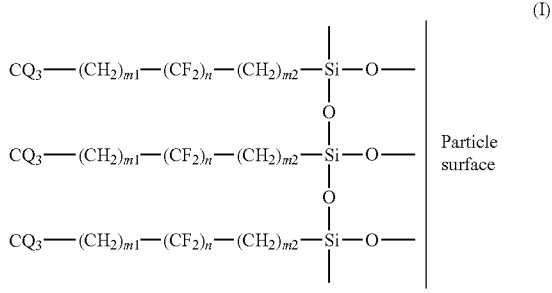

In this formula, Q denotes hydrogen or fluorine.

m1 and m2 each independently denote 0 or a natural number of 1 or more.

In this formula, n is 2 or more as well as 20 or less.

Described below is an example of a method of producing water repellent particles.

A surface active agent expressed by the chemical formula $CX_3$—$(CH_2)m1$-$(CF_2)n$-$(CH_2)m2$-$SiX_3$ is initially dissolved in a nonaqueous solvent to prepare a surface active agent solution. In this formula, X denotes halogen, preferably chlorine.

Then, a plurality of particles are immersed in the surface active agent solution in a dry atmosphere to obtain a plurality of water-repellent particles.

For details thereof, reference can be made to U.S. Pat. No. 5,270,080 (corresponding to Japanese Examined Patent Publication No. 07-063670 B).

Examples of the material for the water-repellent film include a chlorosilane material and an alkoxysilane material. Examples of the chlorosilane material include heptadecafluoro-1,1,2,2-tetrahydrodecyltrichlorosilane and n-octadecyldimethylchlorosilane. Examples of the alkoxysilane material include n-octadecyltrimethoxysilane and nonafluorohexyltriethoxysilane.

The water-repellent particle layer 104 preferably has slight thermal conductivity so as to decrease thermal conduction between the water tank 102 and the devolatilizing layer 105. The water tank 102 has a predetermined or higher temperature (e.g. 40 C° or more as well as 60 C° or less) in order that liquid 4a is heated to water-evaporate in the water tank 102. The devolatilizing layer 105 has a predetermined or lower temperature (e.g. 15 C° or less) so as to liquefy water vapor. The water tank 102 and the devolatilizing layer 105 are quite different from each other in temperature. Desalination efficiency can possibly deteriorate if thermal conductivity is high between the water tank 102 and the devolatilizing layer 105.

The water-repellent particle layer 104 is made of the plurality of closely located water-repellent particles, among which there is air or the like. The water-repellent particle layer 104 is thus less thermally conductive than a film or the like made of a uniform material.

The water-repellent particle layer 104 is 1 cm or more and 30 cm or less in thickness, for example.

If the water-repellent particle layer 104 is too thin (less than 1 cm thick), water poured into the water tank 102 can possibly flow into the devolatilizing layer 5. In contrast, if the water-repellent particle layer 104 is too thick (more than 30 cm thick), water vapor to be described later has difficulty to pass through the gaps in the water-repellent particle layer 104.

<Devolatilizing Layer 105>

The devolatilizing layer 105 is located below the water-repellent particle layer 104. The devolatilizing layer 105 can be made of a plurality of particles to which water repellent treatment is not applied. The devolatilizing layer 105 can be alternatively provided as a space surrounded with the lower side wall 103a and the bottom plate 103b.

The entire side portion of the devolatilizing layer 105 can be surrounded with the lower side wall 103a and the bottom portion of the devolatilizing layer 105 can be covered with the bottom plate 103b, so that the container 103 is capable of reserving the fresh water 4g.

Water vapor passing from the water-repellent particle layer 104 through the gaps in the water-repellent particle layer 104 and reaching the devolatilizing layer 105 is liquefied into liquid water (fresh water 4g) in the devolatilizing layer 105. Details thereof will be described later.

The devolatilizing layer 105 is cooled as necessary.

The devolatilizing layer 105 is cooled in the following manner, for example. The devolatilizing layer 105 is at least partially located in soil 113 so as to be cooled. For example, the interface between the devolatilizing layer 105 and the water-repellent particle layer 104 is made flush with the level of the ground surface, so that the devolatilizing layer 105 is made lower in temperature than the water-repellent particle layer 104.

The devolatilizing layer 105 can alternatively have a cooling portion.

Described below is desalination using the desalination apparatus 1A thus configured.

<Desalination>

Figure 2:
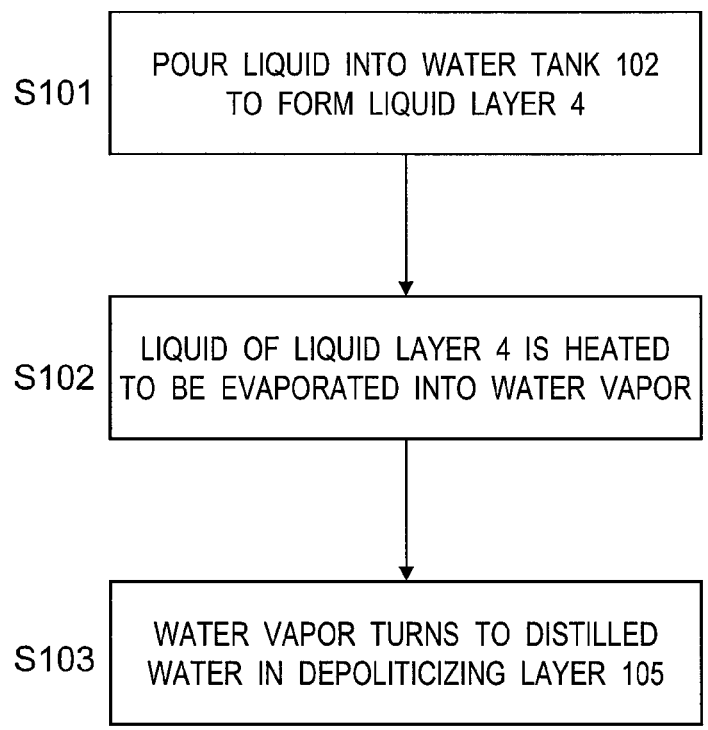
FIG. 2 is a flowchart of desalination steps by the desalination apparatus according to the first embodiment.

FIG. 2 illustrates the steps of desalination by the desalination apparatus 1A.

<Step S101>

Liquid is initially poured from the external tank 6 through the water gate 101 and the introduction path 101a into the water tank 102, and forms the liquid layer 4 on the water-repellent particle layer 104 provided in the water tank 102. Examples of the liquid include salt water.

<Step S102>

The liquid of the liquid layer 4 in the water tank 102 is then heated. When the liquid is heated to reach or exceed a fixed temperature, the liquid is water-evaporated. For example, the fixed temperature is set depending on the type of liquid and air pressure in accordance with the saturated water vapor pressure curve. When the liquid is salt water, the example of the fixed temperature is 50 C° or more as well as 60 C° or less.

The liquid of the liquid layer 105 is heated by solar light, as one example of the heating. Alternatively, the liquid of the liquid layer 4 is heated by the heater provided to the water tank 102. Still alternatively, a heated object can be supplied to the liquid layer 4 so that the liquid is heated.

<Step S103>

The water vapor evaporated from the liquid by heating the liquid then moves upward as well as downward. The water vapor moving downward passes through the gaps among the water-repellent particles in the water-repellent particle layer 104 and reaches the devolatilizing layer 105. The water vapor passing through the gaps among the water-repellent particles in the water-repellent particle layer 104 is liquefied into liquid water in the devolatilizing layer 105. For example, the water vapor is cooled and liquefied into liquid water in the devolatilizing layer 105.

In this manner, the desalination apparatus 1A generates water that includes less solid matters contained and fewer impurities dissolved in the liquid poured into the water tank 102.

Examples of the impurities include ions. Examples of the liquid water obtained at the devolatilizing layer 105 include fresh water. The water obtained at the devolatilizing layer 105 is also called "distilled water".

Modification Example 1

Figure 3:
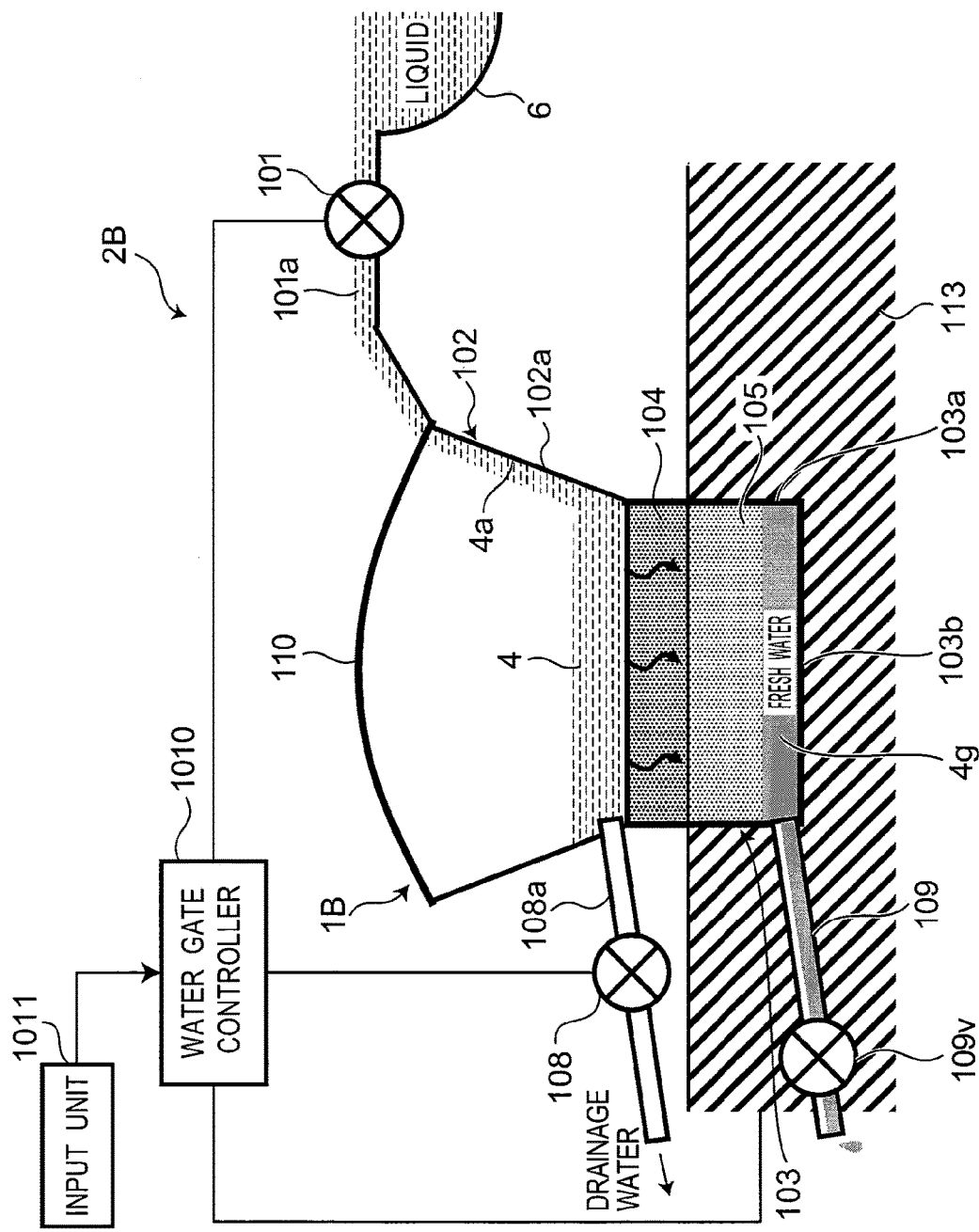
FIG. 3 is a view of a desalination system including a desalination apparatus according to a modification example.

FIG. 3 is shows a desalination system 2B including a desalination apparatus n according to a modification example of the desalination apparatus 1A.

The water tank 102 can optionally have a drain pipe 108a and a drain valve 108 used for draining liquid of the liquid layer 4 to the outside. When the drain valve 108 is opened, the liquid of the liquid layer 4 is drained from the water tank 102. Closing the drain valve 108 stops draining the liquid of the liquid layer 4 from the water tank 102. The water gate controller 1010 controls opening/closing of the drain valve 108.

There can be optionally provided a film or another structure between the water tank 102 and the water-repellent particle layer 104 so as to allow liquid or water vapor to pass therethrough. Furthermore, there can be optionally provided a film or another structure between the water-repellent particle layer 104 and the devolatilizing layer 105 so as to allow water vapor to pass therethrough.

The water tank 102 can optionally have a distilled water drain pipe 109 and a distilled water drain valve 109v used for draining distilled water in the devolatilizing layer 105 to the outside. When the distilled water drain valve 109v is opened, distilled water in the devolatilizing layer 105 is drained through the distilled water drain pipe 109 to the outside. In contrast, closing the distilled water drain valve 109v stops draining the distilled water in the devolatilizing layer 105. The water gate controller 1010 can optionally control opening/closing of the distilled water drain valve 109v.

As shown in FIG. 3, the water tank 102 can optionally have a lid 110 covering an opening in the upper side wall 102a. The lid 110 is capable of decreasing water vapor that is released outward from the water tank 102. The lid 110 is also capable of decreasing impurities that enter from the opening of the water tank 102. When the seawater layer 4 is heated by solar light, the lid 7 is preferably transparent.

The above example refers to the case of obtaining fresh water from salt water. In another case of obtaining distilled water from not salt water but drainage water or the like containing chemical substances dissolved therein, it is also possible to decrease the chemical substances dissolved in the liquid. The desalination apparatuses 1A and 113 are each capable of exerting similar effects as a distillation apparatus. In other words, each of the desalination apparatuses 1A and 1B removes impurities dissolved in liquid.

The desalination apparatuses 1A and 1B are configured as described above.

Described next is finding as the basis of the present disclosure, prior to disclosure of the detailed configuration of a desalination system 2 according to the first embodiment of the present disclosure.

(Finding as Basis of the Invention)

The present inventors have reached the finding that, when introducing liquid to the water tank 102, the water-repellent particles possibly move easily so that the surface (top surface) of the water-repellent particle layer 104 is eroded partially. FIGS. 4A to 4I are enlarged views each exemplifying a state where the surface of the water-repellent particle layer 104 is eroded partially.

<FIG. 4A>

Figure 4A:
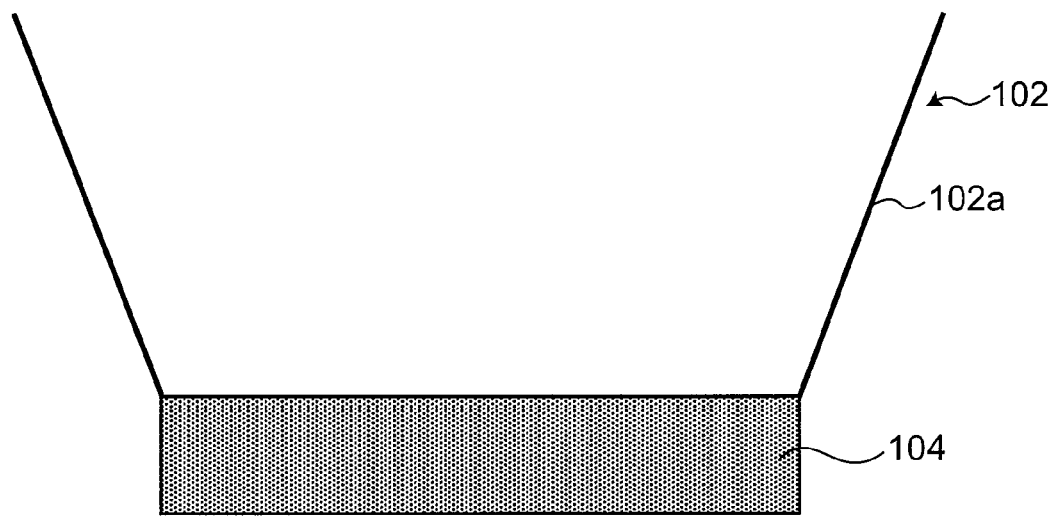
FIG. 4A is an enlarged sectional view exemplifying a state where a water-repellent particle layer is eroded partially.

FIG. 4A shows a state before the liquid 4a is introduced to the water tank 102. In this figure, only part of the water tank 102 and the water-repellent particle layer 104 are enlarged in the desalination apparatus 1A. Exemplified below is a case where the water-repellent particle layer 104 has a flat top surface and the liquid 4a is introduced from the opening of the water tank 102 along the upper-side side wall 102a of the water tank 102.

<FIG. 4B>

Figure 4B:
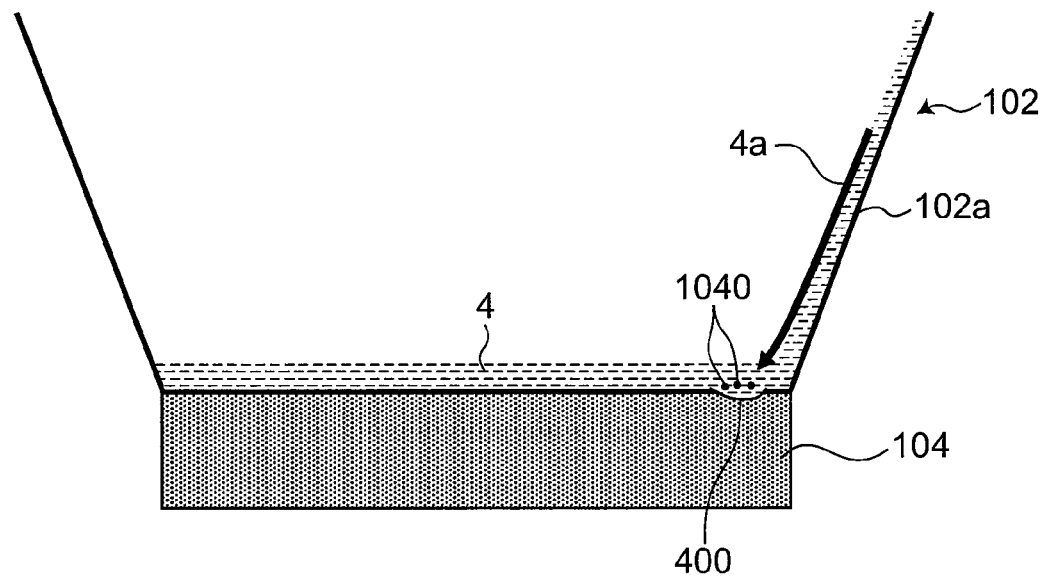
FIG. 4B is an enlarged sectional view exemplifying a state where a water-repellent particle layer is eroded partially.

FIG. 4B shows a state where the liquid 4a is introduced to the water tank 102 from the opening of the water tank 102 along the upper-side side wall 102a. The downward arrow indicates the flow of the liquid 4a. The dotted line in the water tank 102 indicates the liquid layer 4 that is reserved in the water tank 102. When the liquid 4a is introduced to the water tank 102, the liquid 4a is reserved to form the liquid layer 4 on the water-repellent particle layer 104. The flow of the introduced liquid 4a causes the water-repellent particles of the water-repellent particle layer 104 to partially fly upward and float in the liquid layer 4, so as to partially erode water-repellent particles 1040 at the surface of a portion through which the liquid 4a is introduced in the surface of the water-repellent particle layer 104. The surface of the portion through which the liquid 4a is introduced in the surface of the water-repellent particle layer 104 is eroded partially, so that the surface of the portion through which the liquid 4a is introduced in the surface of the water-repellent particle layer 104 is partially provided with a concave portion 400. In other words, the water-repellent particles 1040 at the surface of the water-repellent particle layer 104 partially move away and the surface of the water-repellent particle layer 104 partially has a recess (the concave portion 400). The water-repellent particles 1040 at the water-repellent particle layer 104 located at the portion through which the liquid 4a is introduced and where the concave portion 400 is provided fly upward into the liquid layer 4 and float in the liquid layer 4.

<FIG. 4C>

Figure 4C:
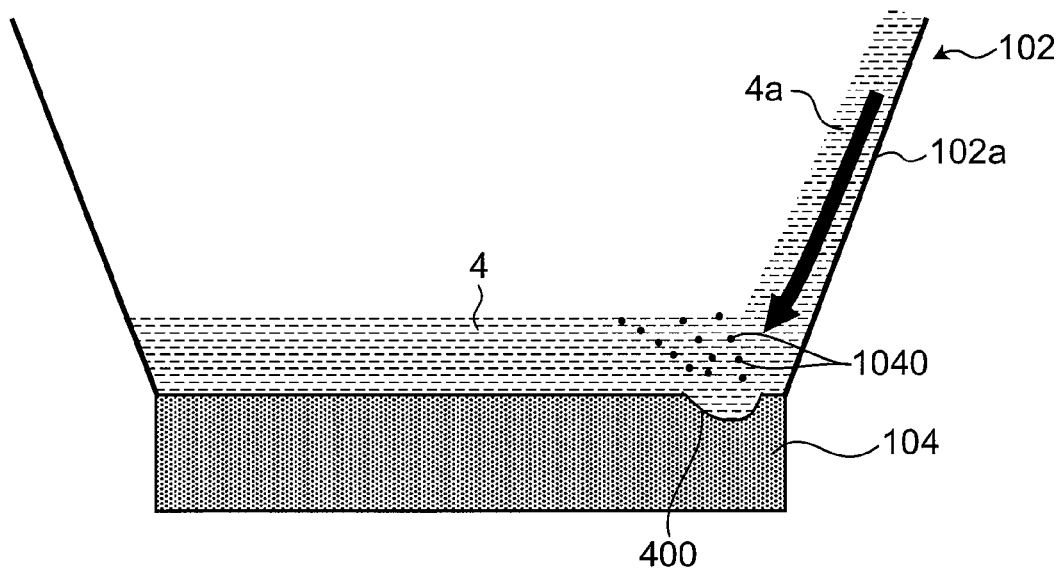
FIG. 4C is an enlarged sectional view exemplifying a state where a water-repellent particle layer is eroded partially.

FIG. 4C shows a state where the liquid 4a is introduced at a larger flow rate to the water tank 102 from the state of FIG. 4B. Similarly to FIG. 4B, the flow of the additionally introduced liquid 4a further erodes partially the portion through which the liquid is introduced in the surface of the water-repellent particle layer 104 (where the concave portion 400 is provided). The additional introduction of the liquid 4a further increases the depth of the concave portion 400. The flow of the liquid 4a moves the water-repellent particles 1040 additionally floating in the liquid layer 4 mainly in the direction away from the concave portion 400 in the liquid layer 4.

<FIG. 4D>

Figure 4D:
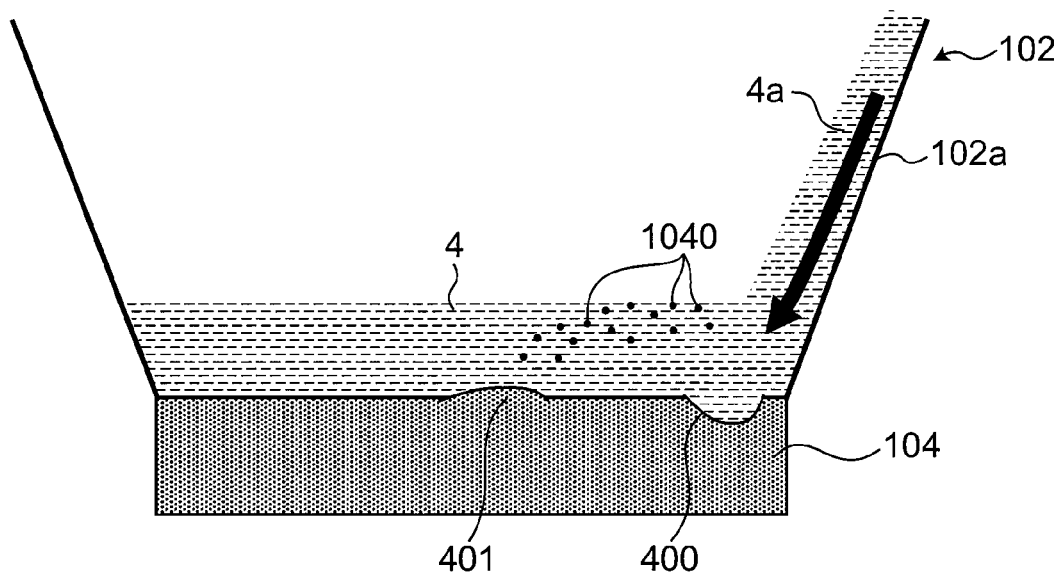
FIG. 4D is an enlarged sectional view exemplifying a state where a water-repellent particle layer is eroded partially.

FIG. 4D shows a state where the water-repellent particles 1040 floating in the liquid layer 4 accumulate on the surface of the portion other than the concave portion 400 in the surface of the water-repellent particle layer 104. The water-repellent particles 1040 accumulate to partially form a plurality of convex portions 401 at the surface of the portion other than the concave portion 400 in the surface of the water-repellent particle layer 104.

<FIG. 4E>

Figure 4E:
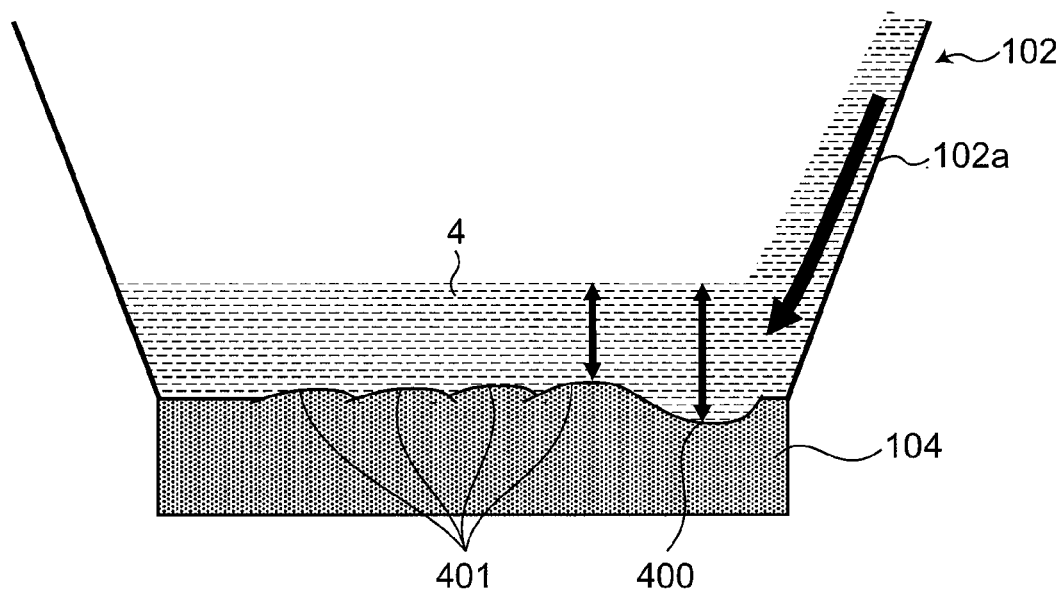
FIG. 4E is an enlarged sectional view exemplifying a state where a water-repellent particle layer is eroded partially.

FIG. 4E shows a state where the liquid layer 4 is formed to have a predetermined level (a level less than water pressure resistance). Introduction of the liquid 4a to the water tank 102 is stopped in this state. As shown in FIGS. 4C and 4D, the liquid 4a introduced to the water tank 102 partially erodes the water-repellent particle layer 104, so that the concave portion 400 and the convex portions 401 are formed at the surface of the water-repellent particle layer 104. In other words, the top surface of the water-repellent particle layer 104 does not have a constant (planar) level but has the concave and convex portions of different levels, so that the level of the liquid layer 4 is partially different. For example, the introduced flow of the liquid 4a is varied in accordance with change in level of the liquid layer 4 in the water tank 104 while the liquid 4a is introduced. The water-repellent particles 1040 floating in the liquid layer 4 are accumulated at different positions of the water-repellent particle layer 104 due to the change in flow of the liquid 4a, so that the plurality of convex portions 401 are formed.

Accordingly, as shown in FIG. 4E, the surface of the water-repellent particle layer 104 can possibly have at least one concave portion 400 and the plurality of convex portions 401. The number of the concave portion 400 is not limited to 1, but the surface of the water-repellent particle layer 104 can possibly have a plurality of concave portions 400 in accordance with the flow of the liquid 4a introduced to the water tank 102 or the method of introducing the liquid 4a.

<FIG. 4F>

After the liquid layer 4 is formed as shown in FIG. 4E, the desalination apparatus 1A performs desalination in the steps S102 and S103. The desalination evaporates the liquid of the liquid layer 4 into water vapor that moves away from the liquid layer 4 and thus decreases the level of the liquid layer 4. Additional liquid 4a is thus introduced to the water tank 102 again.

<FIG. 4G>

The additional liquid 4a introduced to the water tank 102 partially erodes the particles 1040 at the surface of the water-repellent particle layer 104, similarly to the state shown in FIG. 4C. When the liquid 4a is introduced from the same location of the water tank 102, the concave portion 400 is increased in depth.

<FIG. 4H>

The water-repellent particles 1040 floating in the liquid layer 4 are accumulated on the surface of the water-repellent particle layer 104 to form convex portions 401 at the surface of the water-repellent particle layer 104. The convex portions 401 are increased in level when the water-repellent particles 1040 are accumulated on the portions already provided with the convex portions 401.

<FIG. 4I>

As shown in FIGS. 4A to 4H, the concave portion 400 and the plurality of convex portions 401 are formed at the surface of the water-repellent particle layer 104 when the liquid layer 4 is formed.

Figure 4F:
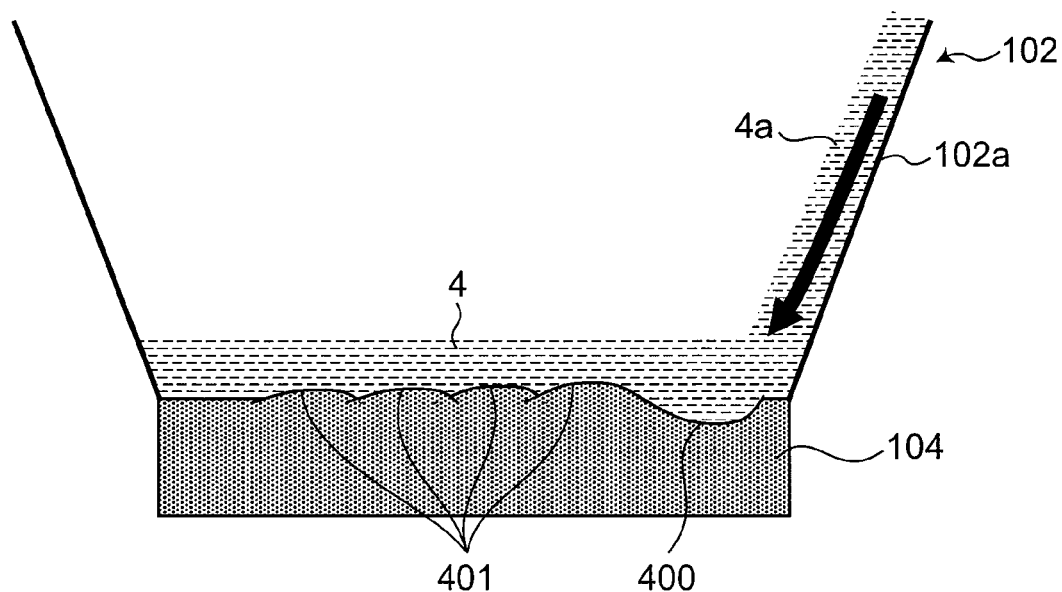
FIG. 4F is an enlarged sectional view exemplifying a state where a water-repellent particle layer is eroded partially.
Figure 4G:
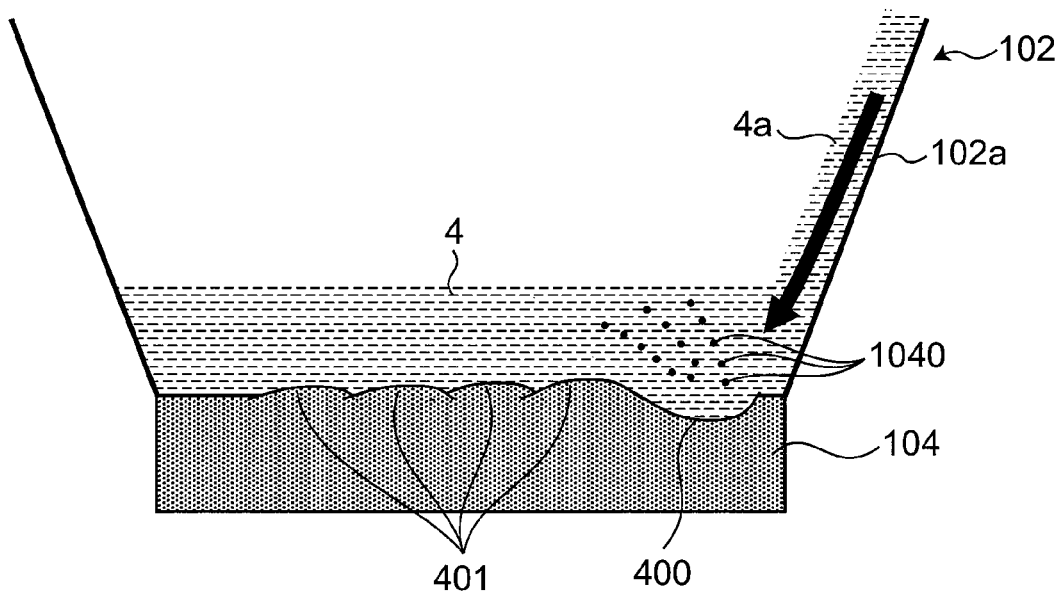
FIG. 4G is an enlarged sectional view exemplifying a state where a water-repellent particle layer is eroded partially.
Figure 4H:
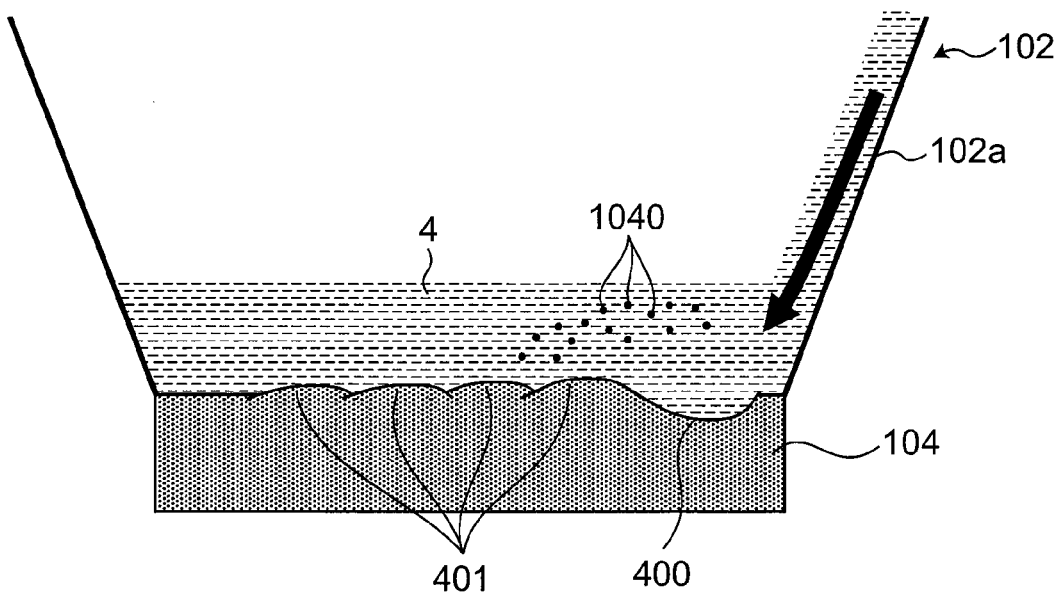
FIG. 4H is an enlarged sectional view exemplifying a state where a water-repellent particle layer is eroded partially.
Figure 4I:
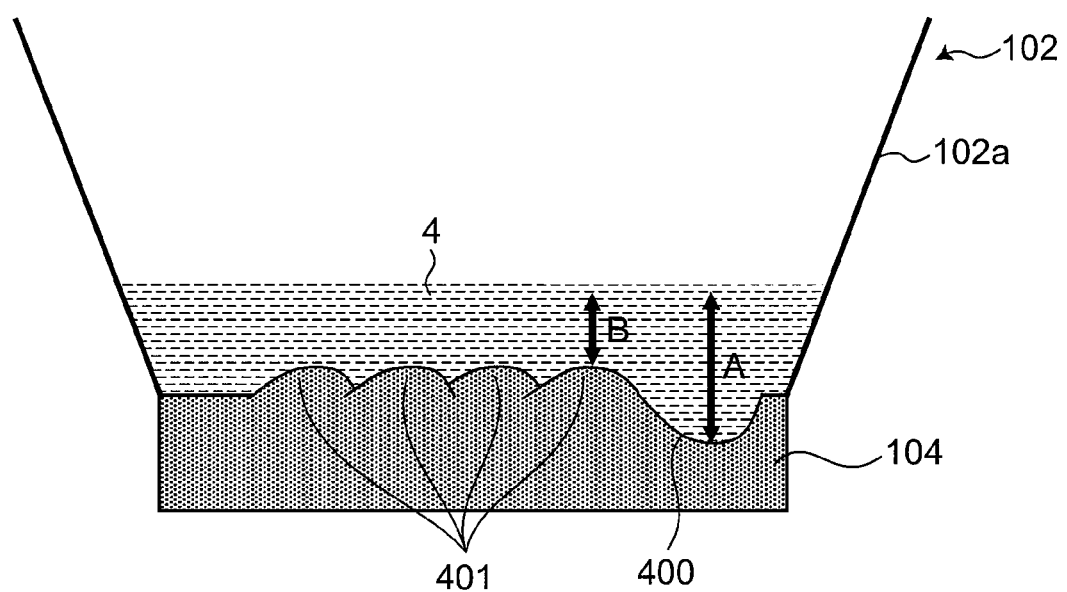
FIG. 4I is an enlarged sectional view exemplifying a state where a water-repellent particle layer is eroded partially.

In FIG. 4I, the distance between the bottom surface (e.g. the most recessed portion) of the concave portion 400 and the top surface of the liquid layer 4 is denoted by "A", and the distance between the top surface (e.g. the most projecting portion) of the convex portion 401 and the top surface of the liquid layer 4 is denoted by "B". The top surface (liquid surface) of the liquid layer 4 is also called a "water surface".

As described above, even when the top surface (water surface) of the liquid layer 4 is constant, the distance "A" between the bottom surface of the concave portion 400 and the water surface is larger than the distance "B" between the top surface of the convex portion 401 and the water surface. Pressure applied to the water-repellent particle layer 104 depends on the distance between the water-repellent particle layer 104 and the water surface, so that the concave portion 400 at the water-repellent particle layer 104 receives pressure different from pressure applied to the convex portion 401 at the water-repellent particle layer 104.

When liquid is introduced to the water tank 102 with no consideration that the concave portion 400 and the convex portions 401 are formed at the surface of the water-repellent particle layer 104, the liquid 4a exceeding water pressure resistance is introduced at part of the water-repellent particle layer 104. In such a case, the water-repellent particle layer 104 cannot hold the liquid 4a so that the liquid enters (breaks) the water-repellent particle layer 104. The phenomenon that the water-repellent particle layer 104 is incapable of holding liquid is also called "breakage".

For example, when the water-repellent particle layer 104 is provided thereon with the liquid layer 4 of a predetermined level (a level less than water pressure resistance) with reference to the planar surface of the water-repellent particle layer 104 prior to erosion, the concave portion 400 receives pressure equal to or more than pressure applied to the reference planar surface (pressure exceeding water pressure resistance) and the water-repellent particle layer 104 can be broken at the concave portion 400.

As shown in FIGS. 4F to 4H, even when the liquid 4a is introduced so as to form a liquid layer 4 as thick as the liquid layer 4 prior to desalination, the water-repellent particle layer 104 can be possibly eroded partially so that pressure applied to the eroded portion (the concave portion 400) at the water-repellent particle layer 104 increases to exceed predetermined water pressure resistance and the water-repellent particle layer 104 is broken at the concave portion 400.

The liquid 4a of the liquid layer 4 evaporates every time desalination is performed. It is thus necessary to introduction additional liquid 4a to the water tank 102. As shown in FIG. 4F, the additional liquid 4a is introduced after desalination so that the concave portion 400 is deepened gradually. More specifically, the distance A between the bottom surface of the concave portion 400 and the top surface of the liquid layer 4 indicated in FIG. 4I keeps increasing unless water-repellent particles are supplied to repair the concave portion 400 at the water-repellent particle layer 104.

The water pressure resistance of the water-repellent particle layer 104 depends on the levels of the surface of the water-repellent particle layer 104 and the top surface of the liquid layer 4. The water-repellent particle layer 104 can be possibly broken if the concave portion 400 is deepened and the level of the liquid layer 4 is not adjusted to be decreased in level. The present inventors thus devised the invention of, with assumption that desalination deepens the concave portion 400, adjusting the level of the liquid layer 4 to effectively prevent breakage of the water-repellent particle layer 104 at the concave portion 400.

The desalination system 2 according to the first embodiment as shown in FIG. 5A includes the water tank 102, the water-repellent particle layer 104, the devolatilizing layer 105, a liquid layer level controller 106, and the water gate controller 1010. The desalination system 2 further includes a liquid layer adjusting apparatus 203 that has the liquid layer level controller 106, the water gate controller 1010, and the like. The desalination system 2 also includes the desalination apparatus 1 that has the water tank 102, the water-repellent particle layer 104, and the devolatilizing layer 105. The desalination apparatus 1 has basic functions same as those of the desalination apparatuses 1A and 1B already described. The desalination apparatus 1 is different from the desalination apparatuses 1A and 1B in that the desalination apparatus 1 includes the liquid layer level controller 106 in order for adjustment of the level of the liquid layer 4. Configurations which are included in the desalination apparatus 1B and its desalination system 2B and are not mentioned in the following disclosure of the desalination apparatus 1 and its desalination system 2 are applicable where appropriate in a modification example of the first embodiment.

A system including the water tank 102, the water-repellent particle layer 104, the devolatilizing layer 105, and the like is also called a desalination system. The liquid layer adjusting apparatus 203 is also called a liquid layer adjusting apparatus included in such a desalination system.

<Liquid Layer Level Controller 106>

Figure 5B:
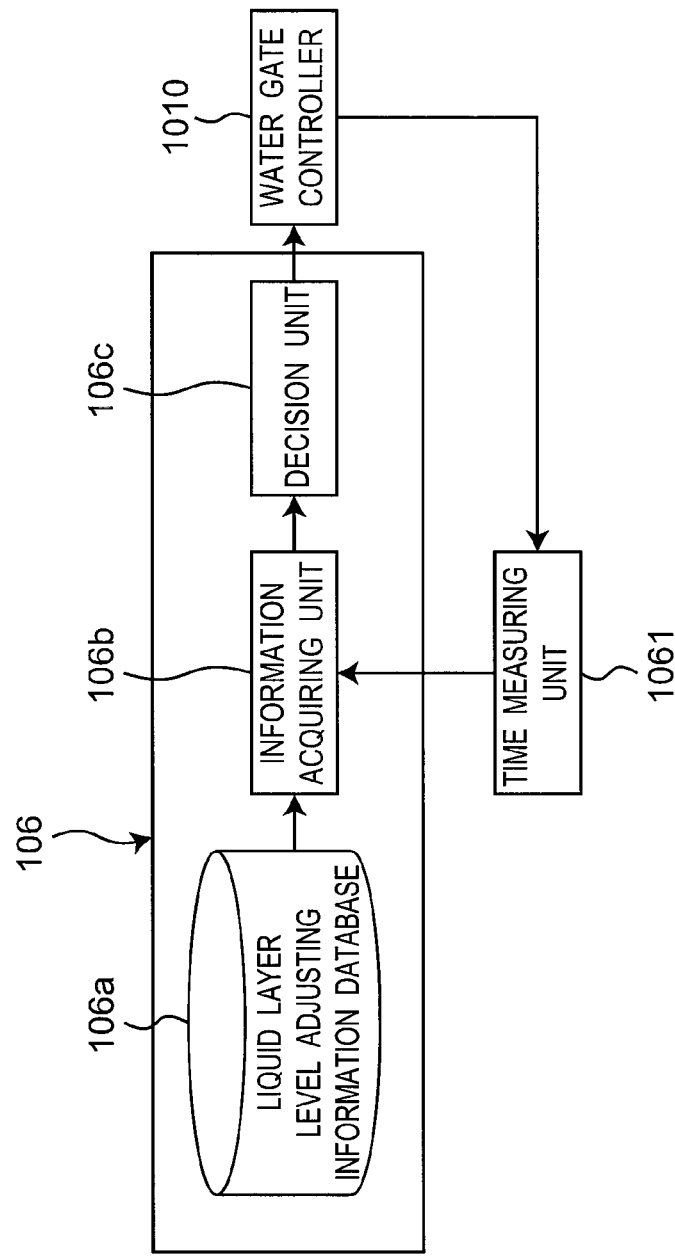
FIG. 5B is a block diagram of a configuration of a liquid layer level controller in the desalination system according to the first embodiment.

The liquid layer level controller 106 estimates the depth of the concave portion 400 at the water-repellent particle layer 104 formed by the liquid 4a introduced to the water tank 102 to determine the level of the liquid layer 4 in the water tank 102. The liquid layer level controller 106 shown in FIG. 5B includes a liquid layer level adjusting information database 106a, an information acquiring unit 106b, and a decision unit (liquid layer level determining unit) 106c.

The information acquiring unit 106b is connected wiredly or wirelessly to the liquid layer level adjusting information database 106a and the decision unit 106c. The information acquiring unit 106b and the decision unit 106c are each connected wiredly or wirelessly to the water gate controller 1010.

The liquid layer level adjusting information database 106a preliminarily stores information (relationship information) on the relationship between information corresponding to an amount of the liquid 4a introduced to the water tank 102 and a predetermined level of the liquid layer 4.

The information acquiring unit 106b preliminarily stores in the database 106a information on the relationship between information on the number of times of introducing the liquid 4a to the water tank 102, which exemplifies information corresponding to the amount of the liquid 4a introduced to the water tank 102, and the predetermined level of the liquid layer 4. The information acquiring unit 106b also acquires the information on the number of times of introduction from the water gate controller 1010 to store the acquired information.

The decision unit 106c refers to the relationship information in the database 106a and determines the predetermined level of the liquid layer 4 in accordance with the information that is acquired by the information acquiring unit 106b and corresponds to the amount of the liquid 4a introduced to the water tank 102. For example, the decision unit 106c decreases the level of the liquid layer 4 as the liquid 4a introduced to the water tank 102 increases in amount.

The decision unit 106c further transmits an open/close adjusting command to the water gate controller 1010 in order to adjust opening/closing of the water gate 101 or opening/closing of the drain valve 108 in accordance with the level of the liquid layer 4 as determined by the decision unit 106c.

The liquid layer level controller 106 can alternatively include the information acquiring unit 106b and the decision unit (liquid layer level determining unit) 106c. In this case, the information acquiring unit 106b and the decision unit (liquid layer level determining unit) 106c are each connected wiredly or wirelessly to the liquid layer level adjusting information database 106a to transmit and receive information.

When the water gate 101 adjusts introduction of the liquid 4a to the water tank 102, the information corresponding to the amount of the liquid 4a introduced to the water tank 102 is exemplified by the number of times of opening/closing the water gate 101. The amount of the liquid 4a introduced to the water tank 102 is in proportion to the number of times of opening/closing the water gate 101. Assume that the water gate 101 is opened at a constant open degree (flow velocity of the liquid 4a). In this case, the information acquiring unit 106b acquires from the water gate controller 1010 information on the number of times of opening/closing the water gate 101 by the water gate controller 1010 and stores the acquired information in the database 106a. The decision unit 106c refers to the database 106a and determines the level of the liquid layer 4 in accordance with the number of times of opening/closing the water gate 101. The decision unit 106c decreases the level of the liquid layer 4 as the number of times of opening/closing the water gate 101 is increased.

When making decision, the decision unit 106c acquires information preliminarily stored in the database 106a, on the relationship between the number of times of opening/closing the water gate 101 and the level of the liquid layer 4 (in an example, see the chart in FIG. 6 to be described later). The relationship information can be stored in the database 106a included in the liquid layer level controller 106, or can be acquired by the information acquiring unit 106b from an external storage unit. The level of the liquid layer 4 corresponds to the surface level of the liquid 4a.

The information on the relationship between the number of times of opening/closing the water gate 101 and the level of the liquid layer 4 includes an equation having the number of times of opening/closing the water gate 101 as a variable. One example of the equation is expressed by (the level of the liquid layer 4)=30 cm−(the number of times of opening/closing the water gate 101)×0.5. The database 106a or the external storage unit stores this equation. The decision unit 106c can substitute the number of times of opening/closing the water gate 101 acquired from the information acquiring unit 106b in the equation and calculate the level of the liquid layer 4 to determine the level of the liquid layer 4.

FIG. 6 shows one example of the information on the relationship between the number of times of opening/closing the water gate 101 and the level of the liquid layer 4. It is estimated that the concave portion 400 is deepened as the number of times of opening/closing the water gate 101 increases. According to the information in FIG. 6, as the number of times of opening/closing the water gate 101 increases, the level of the top surface of the liquid layer 4 from the water-repellent particle layer 104 increases, and therefore the relationship information is thus configured so that the level of the liquid layer 4 is decreased according thereto. The information on the relationship between the number of times of opening/closing the water gate 101 and the level of the liquid layer 4 is preliminarily determined in accordance with formation speed of the concave portion 400 and is stored in the database 106a or the external storage unit.

Another example of the information corresponding to the amount of the liquid 4a introduced to the water tank 102 can include an amount of opening the water gate 101 and a period of opening the water gate 101 in place of the number of times of opening/closing the water gate 101. The amount of opening the water gate 101 can be measured by a flowmeter (not shown) or the like, and corresponds to the amount of the introduced liquid 4a per unit time. The period of opening the water gate 101 corresponds to the period of introducing the liquid 4a. In this case, the information acquiring unit 106b acquires the amount of opening the water gate 101 and the period of opening the water gate 101 from the flowmeter (not shown) and the water gate controller 1010.

In an exemplary case where the introduced amount of the liquid 4a per unit time while the water gate 101 is opened is constant and the period of opening the water gate 101 is also constant, the decision unit 106c is capable of estimating the amount of the liquid 4a introduced to the water tank 102 in accordance with the number of times of opening/closing the water gate 101. Assume that both the maximum open degree and the opening/closing speed of the water gate 101 are constant in this case.

In a case where the introduced amount of the liquid 4a per unit time while the water gate 101 is opened is constant (unchanged), the decision unit 106c is capable of estimating the amount of the liquid 4a introduced to the water tank 102 in accordance with the number of times of opening/closing the water gate 101 and the period of opening the water gate 101.

The number of times of opening/closing the water gate 101 can be replaced with the elapsed time from formation of the liquid layer 4. This is effective when a constant amount of the liquid 4a is introduced to the water tank 102 per unit elapsed time.

FIG. 7A shows an example of information on the relationship between the elapsed time from formation of the liquid layer 4 and the level of the liquid layer 4. The elapsed time corresponds to a period from the time of formation of the liquid layer 4 to the present time (when the water gate is controlled). FIG. 7A indicates the relationship information by the day as a unit elapsed time. Examples of the unit elapsed time include the minute, hour, day, week, month, and year.

The information acquiring unit 106b in the liquid layer level controller 106 acquires an elapsed time from a time measuring unit 1061. The time measuring unit 1061 acquires a start time of formation of the liquid layer 4 and the present time (when the water gate is controlled) from the water gate controller 1010, obtains the elapsed time from the formation of the liquid layer 4, and transmits the obtained elapsed time to the information acquiring unit 106b.

The information acquiring unit 106b in the liquid layer level controller 106 acquires information on the relationship between the elapsed time from the formation of the liquid layer 4 and the level of the liquid layer 4, from the database 106a or the external storage unit. According to the information on the relationship between the information corresponding to the elapsed time and the surface level of the liquid layer 4 in the water tank 102, the surface level of the liquid layer 4 is decreased as the elapsed time from the introduction of the liquid 4a is longer.

If the decision unit 106c decides that the number of times of opening/closing the water gate 101 or the elapsed time is equal to or more than a predetermined value, it is estimated that the concave portion 400 is too deepened and the thickness of the water-repellent particle layer 104 is equal to or less than a certain value. The decision unit 106c can optionally transmit a stop command to the water gate controller 1010 to stop desalination. For example, the decision unit 106c transmits a command to the water gate controller 1010 so that the drain valve 108 is opened and the entire liquid in the water tank 102 is discharged from a drain port 108a. A water-repellent treatment layer 104 is repaired after the liquid in the water tank 102 is discharged from the drain port 108a. Such "Repair" in this case indicates a step of decreasing the depth of the concave portion 400 formed at the water-repellent particle layer 104. Examples of specific repair include filing water-repellent particles in the concave portion 400 to decrease the depth of the concave portion 400, or temporarily removing the entire water-repellent particle layer 104 and forming a new water-repellent particle layer 104, or the like.

<Water Gate Controller 1010>

The water gate controller 1010 controls to independently open/close the water gate 101 and the drain valve 108 so as to adjust the level of the liquid of the liquid layer 4 or remove the entire liquid layer 4. In an example, the water gate controller 1010 controls opening/closing of the water gate 101, so as to adjust the amount of the liquid 4a introduced to the water tank 102 in accordance with the level of the liquid layer 4 as determined by the liquid layer level controller 106.

For example, the water gate controller 1010 can acquire information on the level of the water surface from a water surface level measuring unit 1065 that measures the surface level of the liquid layer 4 in the water tank 102.

Figure 7B:
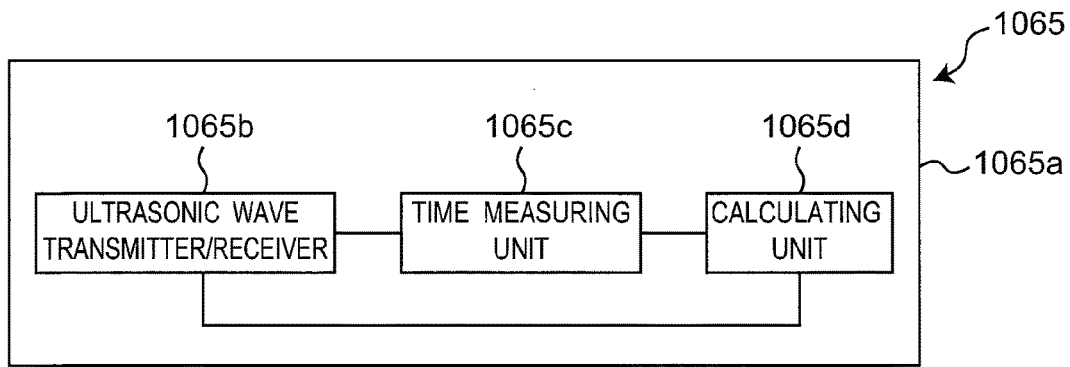
FIG. 7B is a block diagram of a water surface level measuring unit in the desalination system according to the first embodiment.

The water surface level measuring unit 1065 can be embodied by a known water gauge. Examples of the water surface level measuring unit 1065 include an ultrasonic wave measuring unit 1065a. As shown in FIG. 7B, the ultrasonic wave measuring unit 1065a includes an ultrasonic wave transmitter/receiver 1065b, a time measuring unit 1065c, and a calculating unit 1065d. The ultrasonic wave transmitter/receiver 1065b is located on the upper side wall 102a. The ultrasonic wave transmitter/receiver 1065b transmits an ultrasonic wave to the liquid layer 4. The ultrasonic wave transmitter/receiver 1065*b* receives an ultrasonic wave reflected at the liquid layer 4. The time measuring unit 1065*c* measures a period from transmission of an ultrasonic wave from the ultrasonic wave transmitter/receiver 1065*b* to receipt of the wave. The calculating unit 1065*d* calculates the level of the water surface from a predetermined relationship between a time and a distance and the time measured by the time measuring unit 1065*c*. The ultrasonic wave measuring unit 1065*a* for transmitting and receiving an ultrasonic wave can be replaced with a laser light measuring unit for transmitting and receiving laser light.

The water gate controller 1010 opens the water gate 101 to introduction the liquid 4*a* to the water tank 102 until acquiring from the level measuring unit 1065 information on the level of the liquid layer 4 as determined by the liquid layer level controller 106. The water gate controller 1010 closes the water gate 101 when the level of the water surface measured by the level measuring unit 1065 is equal to the level of the liquid layer 4 determined by the liquid layer level controller 106.

<Liquid Layer Level Adjustment Step by Desalination System 2>

Figure 8:
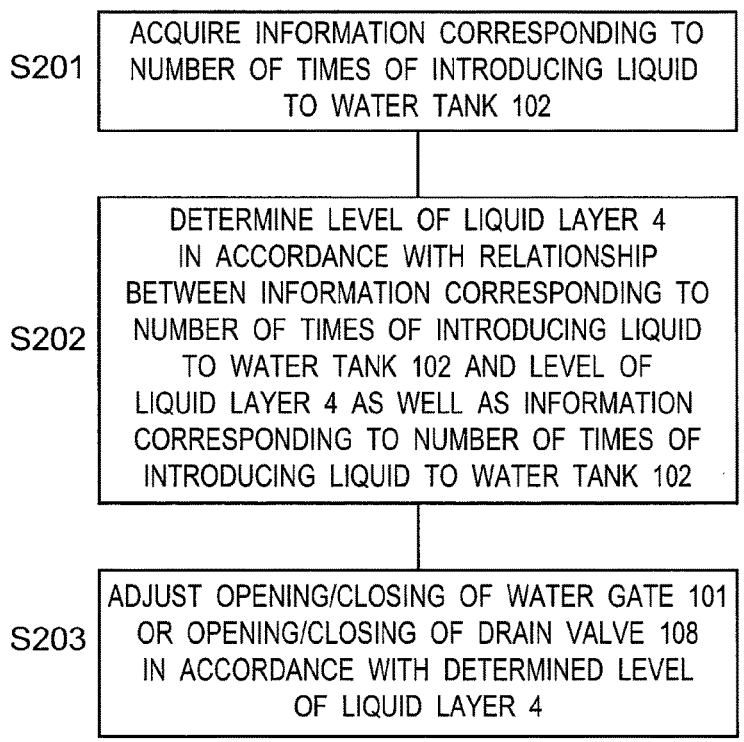
FIG. 8 is a flowchart of liquid layer level adjustment by a liquid layer adjusting apparatus in the desalination system according to the first embodiment.

FIG. 8 is a flowchart of liquid layer level adjustment step by the liquid layer adjusting apparatus 203.

<Step S201>

The information acquiring unit 106*b* in the liquid layer level controller 106 initially causes the water gate controller 1010 to open the water gate 101 and acquires information corresponding to the number of times of introducing the liquid 4*a* to the water tank 102, from the water gate controller 1010. As described above, examples of the information corresponding to the number of times of introducing the liquid 4*a* to the water tank 102 include the number of times of opening/closing the water gate 101 and the elapsed time from formation of the liquid layer 4. The information acquiring unit 106*b* in the liquid layer level controller 106 acquires the information from the water gate controller 1010.

<Step S202>

The decision unit 106*c* in the liquid layer level controller 106 subsequently determines the level of the liquid layer 4 in accordance with the information on the relationship between the information corresponding to the number of times of introducing the liquid 4*a* to the water tank 102 and the level of the liquid layer 4 as stored in and read out of the database 106*a* and the information corresponding to the number of times of introducing the liquid 4*a* to the water tank 102 as acquired by the information acquiring unit 106*b*. More specifically, the decision unit 106*c* refers to the information on the relationship between the number of times and the level stored in the database 106*a* in accordance with the number of times of introducing the liquid 4*a* to the water tank 102 as acquired by the information acquiring unit 106*b*, resulting in determining the level of the liquid layer 4.

<Step S203>

The decision unit 106*c* subsequently transmits a command (signal) to the water gate controller 1010 in order to adjust opening/closing of the water gate 101 or opening/closing of the drain valve 108 in accordance with the level of the liquid layer 4 as determined by the decision unit 106*c*. Upon receipt of the command from the decision unit 106*c*, the water gate controller 1010 adjusts opening/closing of the water gate 101 in accordance with the level of the liquid layer 4 as determined by the decision unit 106*c*. More specifically, for example, the decision unit 106*c* calculates the time of opening the water gate 101 until the liquid layer 4 reaches the determined level, and controls the water gate controller 1010 to open the water gate 101 during the calculated time.

It is thus possible to effectively prevent breakage of the water-repellent particle layer 104 at the concave portion 400 and efficiently and reliably perform automatic desalination.

Modification Example 2

According to the first embodiment and the modification example 1, the water gate controller 1010 controls to open the single water gate 101 and introduction the liquid 4*a* to the water tank 102 through the single introduction path 101*a*. Alternatively, a plurality of water gates 101 can be opened so that liquid 4*a* is introduced to the water tank 102 through a plurality of introduction paths 101*a*. In such a case where the liquid 4*a* is introduced from the plurality of introduction paths 101*a* to the water tank 102, the information on the relationship between the information corresponding to the number of times of introducing the liquid 4*a* and the level of the liquid layer 4 can be set in view of the number of the introduction paths 101*a* used for introducing the liquid 4*a*.

Figure 9A:
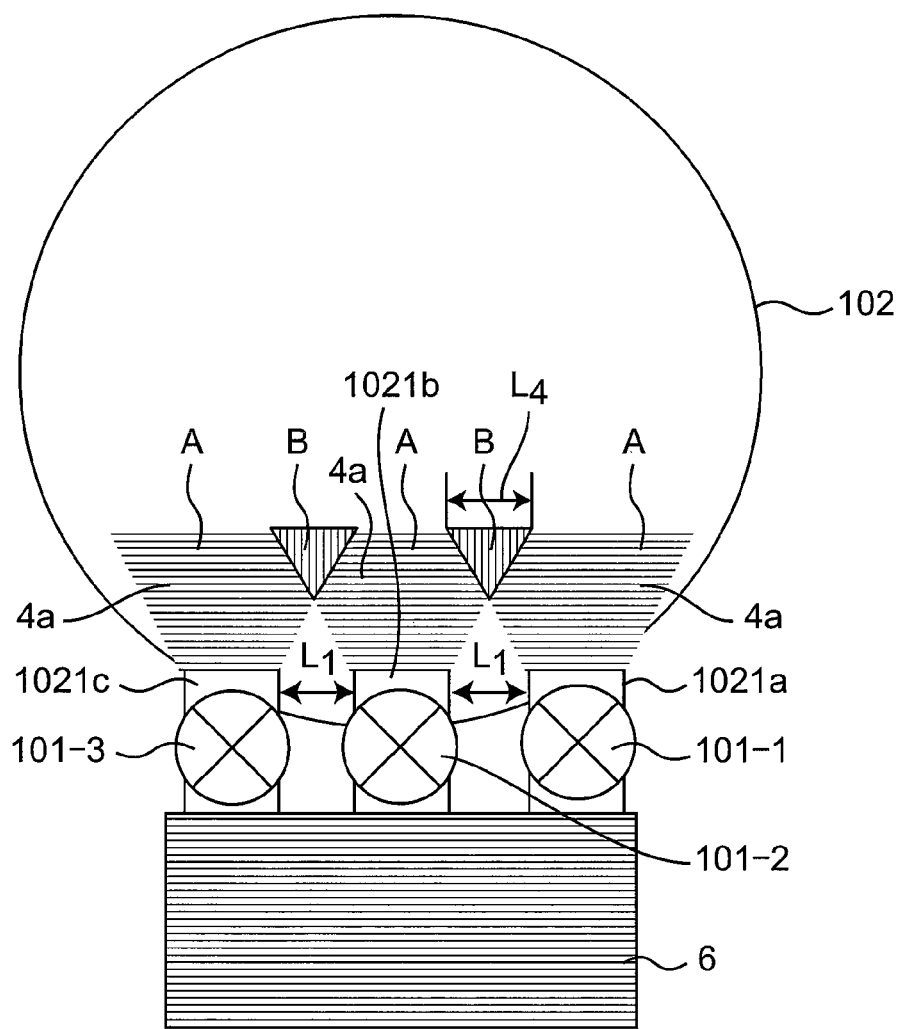
FIG. 9A is a top view showing a state where liquid is introduced to a water tank in the desalination system according to the first embodiment.
Figure 9B:
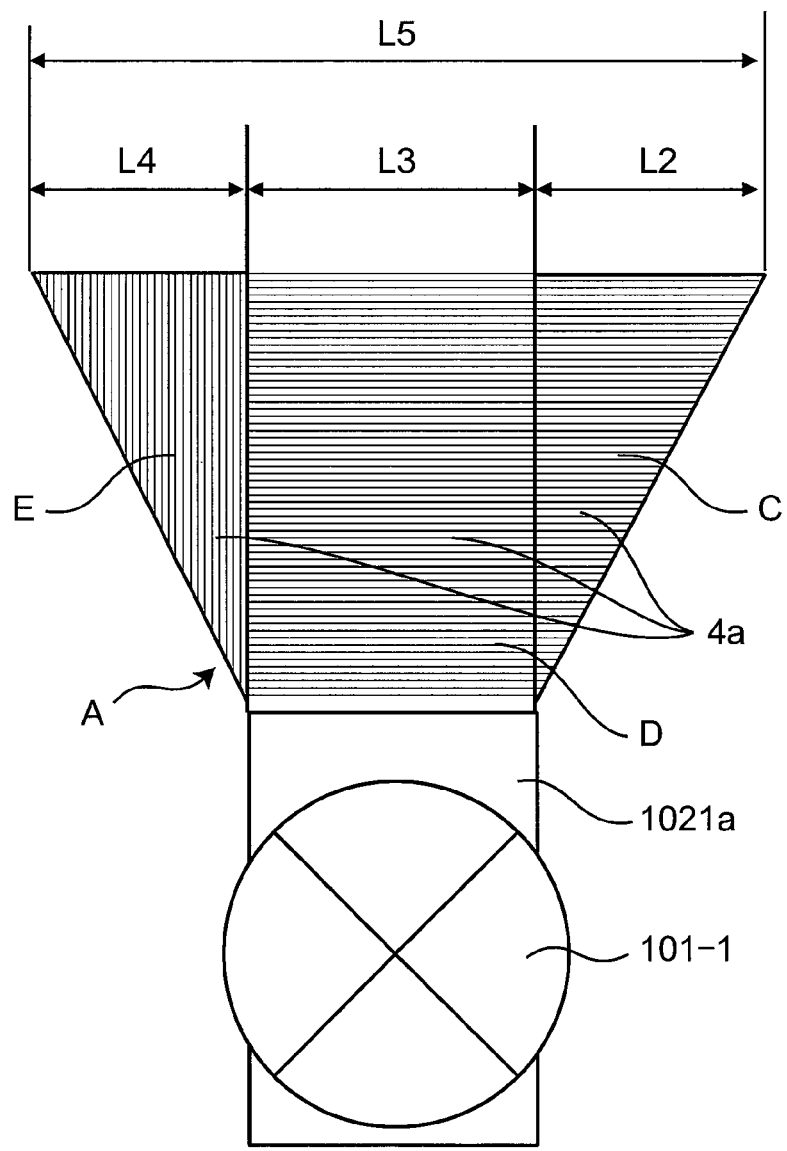
FIG. 9B is an enlarged top view showing a flow of the liquid through an introduction path in the state of FIG. 9A.

For example, each of FIGS. 9A and 9B is a top view showing a state where the liquid 4*a* is introduced to the water tank 102. In this case, the introduction paths 101*a* include three introduction paths 1021*a*, 1021*b*, and 1021*c* and the water gates 101 include three water gates 101-1, 101-2, and 101-3.

Figure 9C:
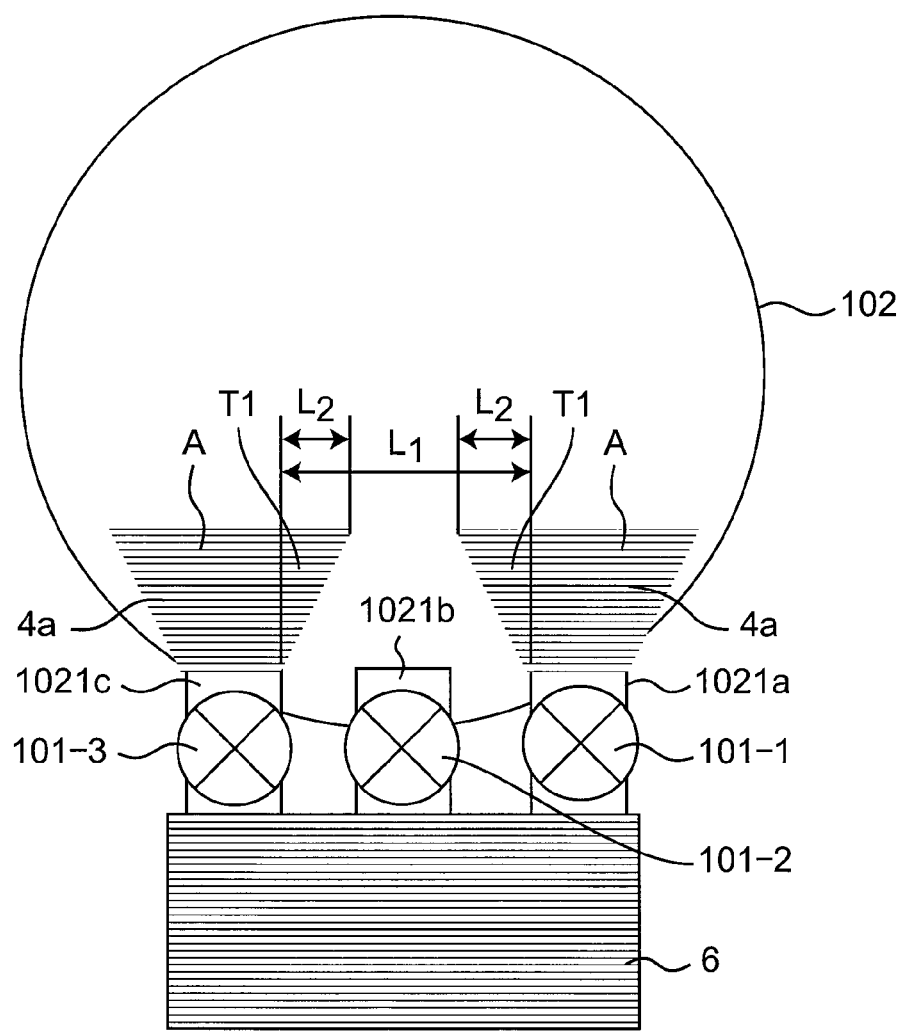
FIG. 9C is a top view showing another state where the liquid is introduced to the water tank in the desalination system according to the first embodiment.

The water tank 102 shown in FIGS. 9A and 9C is provided on the side wall with the three introduction paths 1021*a*, 1021*b*, and 1021*c*. The introduction paths 1021*a*, 1021*b*, and 1021*c* are connected to the three water gates 101-1, 101-2, and 101-3, respectively, that are controlled to open and close by the water gate controller 1010. The water gates 101-1, 101-2, and 101-3 are each connected to the external tank 6. When the water gate controller 1010 opens each of the water gates 101-1, 101-2, and 101-3, the liquid 4*a* in the external tank 6 is introduced to the water tank 102. Closing each of the water gates 101-1, 101-2, and 101-3 stops introduction of the liquid 4*a* from the external tank 6 to the water tank 102.

FIG. 9A shows a state where the liquid 4*a* is introduced simultaneously to the water tank 102 through the three introduction paths 1021*a*, 1021*b*, and 1021*c*. FIG. 9B is an enlarged top view showing a flow of the liquid 4*a* through one of the introduction paths in the state of FIG. 9A. FIG. 9C shows a state where the liquid 4*a* is introduced simultaneously to the water tank 102 through the two introduction paths 1021*a* and 1021*c* at the both ends out of the three introduction paths 1021*a*, 1021*b*, and 1021*c*. In FIGS. 9A and 9C, shaded regions A indicate the flows of the liquid 4*a* introduced to the water tank 102 through the three introduction paths 1021*a*, 1021*b*, and 1021*c* and through the two introduction paths 1021*a* and 1021*c*, respectively.

The liquid 4*a* introduced through each of the introduction paths 1021*a*, 1021*b*, and 1021*c* forms a flow expanding in a fan shape or the like (e.g. an inverted trapezoidal shape) and is reserved in the water tank 102. For example, a predetermined region (the region indicated in FIG. 9A) forming the flow of the liquid has a fan shape (e.g. an inverted trapezoidal shape) having the center at an opening of each of the introduction paths.

When the flows of the introduced liquid 4*a* expand, the flows of the liquid introduced through the plurality of introduction paths can be possibly overlapped in some regions. Shaded regions B in FIG. 9A each indicate a portion where the flows of the liquid 4a introduced to the water tank 102 through the two adjacent introduction paths 1021a and 1021b or 1021b and 1021c out of the three introduction paths 1021a, 1021b, and 1021c are overlapped with each other. In each of the shaded regions B (hereinafter, also called an overlapped region B) it is assumed that the amount of the introduced liquid 4a is larger than that in a region other than the overlapped region B and the concave portion 400 is deepened partially.

Whether or not there is the shaded region B depends on whether or not the predetermined regions (the shaded regions A shown in FIG. 9A) forming the flows of the liquid 4a introduced through the respective introduction paths are overlapped with each other.

FIG. 9B shows the enlarged shaded region A indicating the flow of the liquid introduced through the introduction path 1021a in FIG. 9A (this applies to each of the introduction paths 1021b and 1021c). The shaded region A indicating the flow of the liquid 4a includes a shaded region D formed in the direction of introducing the liquid 4a through the introduction path 1021a (in the direction of the opening of the introduction path 1021a) (e.g. upward in the up-down direction in FIG. 9B), a shaded region C expanded rightward from the direction of introducing the liquid 4a, and a shaded region E expanded leftward from the direction of introducing the liquid 4a. In the direction perpendicular (e.g. the right-left direction in FIG. 9B) to the direction (e.g. upward in the up-down direction in FIG. 9B) of introducing the liquid 4a through the introduction path 1021a in FIG. 92, the shaded region C has a maximum length $L_2$, the shaded region D has a maximum length $L_3$, the shaded region E has a maximum length $L_4$, and the shaded region A (including the shaded regions C, D, and E) has a maximum length $L_5$.

The areas of the shaded regions C and D depend on the amount of the introduced liquid 4a per unit time or the like. The shaded regions C and E shown in FIG. 9B are bilaterally symmetric. The shaded regions C and E can be asymmetric depending on the positional relationship between the introduction path 1021a and the introduction path 1021b or the direction of the opening of the introduction path 1021a.

When the shaded regions C and E formed by the liquid 4a introduced through the adjacent introduction paths are overlapped with each other, the shaded region B shown in FIG. 9A is formed. More specifically, the shaded region B is formed when the sum of the vertical maximum length $L_4$ of the region E expanded from the direction of introducing the liquid 4a through the introduction path 1021a (the direction of the opening of the introduction path 1021a) (e.g. upward in the up-down direction in FIG. 9A) and the vertical maximum length $L_2$ of the region C expanded from the direction of introducing the liquid 4a through the introduction path 1021b is larger than the distance between these adjacent introduction paths.

For example, in FIG. 9A, the shaded region B is formed when the distance obtained by adding the maximum length (e.g. the length $L_4$ in FIG. 9B) of the region E expanded leftward from the shaded region A in the direction perpendicular (e.g. the right-left direction in FIG. 9A) to the direction of introducing the liquid 4a through the introduction path 1021a and the maximum length (e.g. the length $L_2$ in FIG. 9B) of the region C expanded rightward from the shaded region A in the direction perpendicular to the direction of introducing the liquid 4a through the introduction path 1021b is smaller than a distance $L_1$ between the opening of the introduction path 1021a and the opening of the introduction path 1021b.

More specifically, the following is applicable when the liquid 4a introduced through any two introduction paths forms the shaded regions A in the inverted trapezoidal shapes of the same areas as shown in FIG. 9C. In FIG. 9C, the amounts of the liquid 4a introduced through the introduction paths 1021a and 1021c are equal per unit time. The liquid 4a introduced through each of the introduction paths 1021a and 1021c forms the shaded region A having the inverted trapezoidal shape of the same area.

The distance $L_1$ between the adjacent introduction paths is defined as a gap between the end, close to the center introduction path 1021b, of the opening of the right-end introduction path 1021a and the end, close to the center introduction path 1021b, of the opening of the left-end introduction path 1021c in FIG. 9C. Lines extended upward from the end, close to the center introduction path 1021b, of the opening of the right-end introduction path 1021a, as well as from the end of the upper bottom (the lower side in FIG. 9C) of the inverted trapezoidal shape of the shaded region A of the liquid 4a flown out through the right-end introduction path 1021a, and the lower bottom (the upper side in FIG. 9C) of the inverted trapezoidal shape cross to form a right triangle Ti. The distance $L_2$ at the bottom side of the right triangle is assumed to be the maximum width $L_2$ of the region A of the liquid 4a flown out of the opening of the right-end introduction path 1021a so as to expand toward the opening of the center introduction path 1021b. The overlapped shaded region B is formed if the maximum width $L_2$ is larger than a half of the distance $L_1$ between the adjacent openings (see FIG. 9A). In contrast, the overlapped shaded region B is not formed if the maximum width $L_2$ is smaller than a half of the distance $L_1$ between the adjacent openings (see FIG. 9C).

In other words, if the distance $L_1$ between the plurality of introduction paths used for introducing the liquid 4a is equal to or less than a predetermined distance, the liquid 4a introduced through these introduction paths forms an overlapped portion. If the distance $L_1$ between the plurality of introduction paths used for introducing the liquid 4a is more than the predetermined distance, the liquid 4a introduced through these introduction paths does not form any overlapped portion. The predetermined distance can be decided depending on the amount of the introduced liquid or the direction of the opening of the introduction path.

At the water-repellent particle layer 104 receiving the flow indicated by the shaded region B, the flows of the liquid 4a through the two introduction paths 1021a and 1021b or the two introduction paths 1021b and 1021c form the deeper concave portion 400 in the water-repellent particle layer 104. Meanwhile, at the water-repellent particle layer 104 receiving the flow indicated by the shaded region A, the flow of the liquid 4a through any one of the introduction paths 1021a, 1021b, and 1021c forms the concave portion 400 in the water-repellent particle layer 104.

When introducing the liquid 4a of a similar amount to the water tank 102, the concave portion 400 formed at the water-repellent particle layer 104 receiving the flows of the liquid 4a indicated by the vertically hatched region B is deeper than the concave portion 400 formed at the water-repellent particle layer 104 receiving the flow of the liquid 4a indicated by the horizontally hatched region A.

Accordingly, the decision unit 106c can optionally change the information on the relationship between the information corresponding to the amount of the liquid 4a introduced to the water tank 102 and the level of the liquid layer 4 in accordance with the distance between the plurality of introduction paths used for introducing the liquid 4a to the water tank 102. For example, the decision unit 106c sets the level of the liquid layer 4 in the case where the distance $L_1$ between the adjacent introduction paths is equal to or less than the predetermined distance so as to be higher than the level of the liquid layer 4 in the case where the distance $L_1$ between the adjacent introduction paths is more than the predetermined distance.

The predetermined distance is dependent on the difference in level between the bottom surface of the introduction path and the water surface, the amount of the introduced liquid 4a per unit time, or the like. The predetermined distance is 1 m, for example.

FIG. 10A exemplifies values before and after change of the relationship information on the level of the liquid layer 4 in accordance with the distance $L_1$ between the plurality of introduction paths used for introducing the liquid 4a to the water tank 102. The information on the relationship between the number of times of opening/closing the water gate 101 and the level of the liquid layer 4 after the change (see the right chart in FIG. 10A) includes the levels of the liquid layer 4 higher than those in the relationship information on the level of the liquid layer 4 before the change (see the right and left charts in FIG. 10A).

In an example, the level of the liquid layer 4 in the case where the number of times of opening/closing the water gate 101 before the change is 1 is lower by 0.5 cm than the level of the liquid layer 4 in the case where the number of opening/closing times is 0. Meanwhile, the level of the liquid layer 4 in the case where the number of times of opening/closing the water gate 101 after the change is 1 is lower by 0.2 cm than the level of the liquid layer 4 in the case where the number of opening/closing times is 0. In summary, the change in level of the liquid layer 4 each time the number of times of opening/closing the water gate 101 increases in the relationship information after the change is smaller than the change in level of the liquid layer 4 in the relationship information before the change. The level of the liquid layer 4 is changed largely by decreasing the change in level of the liquid layer 4 (the amount of decreasing the level of the liquid layer 4).

If there is a portion (the overlapped region B) receiving the flows of water through the plurality of introduction paths, the level of the liquid layer 4 can be obtained by adding a predetermined value as a safety coefficient for prevention of breakage to the reference level of the liquid layer 4.

Alternatively, the database 106a or the external storage unit can store both of the information on the relationship between the information corresponding to the amount of the liquid 4a introduced to the water tank 102 and the surface level of the liquid 4a in the water tank 102 in the case where there is the portion (the overlapped portion B) receiving flows of water from a plurality of introduction paths and the information on the relationship between the information corresponding to the amount of the liquid 4a introduced to the water tank 102 and the surface level of the liquid 4a in the water tank 102 in the case where there is not the portion (the overlapped region B) receiving flows of water from a plurality of introduction paths.

The information acquiring unit 106b in the liquid layer level controller 106 acquires information on opening/closing of each of the water gates 101-1, 101-2, and 101-3 from the water gate controller 1010. If the distance $L_1$ between the plurality of introduction paths on which the water gates 101 are opened is equal to or less than the predetermined distance, the decision unit 106c determines the level of the liquid layer 4 in accordance with the information on the relationship between the information corresponding to the amount of the liquid 4a introduced to the water tank 102 and the surface level of the liquid 4a in the water tank 102 in the case where there is a portion receiving flows of water from a plurality of introduction paths. If the distance $L_1$ between the plurality of introduction paths on which the water gates 101 are opened is more than the predetermined distance, the decision unit 106c determines the level of the liquid layer 4 in accordance with the information on the relationship between the information corresponding to the amount of the liquid 4a introduced to the water tank 102 and the surface level of the liquid 4a in the water tank 102 in the case where there is no portion receiving flows of water from a plurality of introduction paths.

If the a large amount of water vapor is generated from the liquid 4a in the water tank 102 because of high temperature or another reason, a user or the like is capable of commanding, using the input unit 1011, the water gate controller 1010 to increase the amount of the introduced liquid 4a per unit time. For example, the liquid 4a is introduced to the water tank 102 through a plurality of introduction paths. More specifically, as shown in FIG. 9A, the liquid 4a is introduced to the water tank 102 through the three introduction paths 1021a, 1021b, and 1021c.

If the temperature of the liquid 4a introduced to the water tank 102 is lower than the temperature of the liquid 4a of the liquid layer 4, the temperature of the liquid layer 4 is decreased by a large amount of introduced liquid 4a. For example, a command can be issued to decrease the amount of the introduced liquid 4a per unit time so as to decrease the temperature of the liquid layer 4 as less as possible. In this case, a user or the like causes, using the input unit 1011, the water gate controller 1010 to introduction the liquid 4a to the water tank 102 through introduction paths 1021 of a number as less as possible. More specifically, as shown in FIG. 9C, the liquid 4a is introduced to the water tank 102 through the two introduction paths 1021a and 1021c at the both ends without using the center introduction path 1021b.

Force generated by the flow of the liquid 4a and applied to the water-repellent particle layer 104 is dispersed as the number of using introduction paths increases. In this case, the number of concave portions 400 is increased and each of the concave portions 400 is decreased in depth. For example, the decision unit 106c can increase the level of the liquid layer 4 as a larger number of introduction paths are used for introduction of the liquid 4a. More specifically, the decision unit 106c decreases the level of the liquid layer 4 as the number of the introduction paths are larger, with reference to the information on the relationship between the information corresponding to the amount of the liquid 4a introduced to the water tank 102 and the level of the liquid layer 4 as indicated in FIG. 6. If the distance $L_1$ between the plurality of introduction paths is equal to or less than a predetermined value, the decision unit 106c decreases the level of the liquid layer 4 as compared with the case where the distance $L_1$ between the plurality of introduction paths is more than the predetermined value.

According to the first embodiment, the liquid layer level controller 106 determines the level of the liquid 4a introduced to the water tank 102 in accordance with the information on the relationship between the information corresponding to the amount of the liquid 4a introduced to the water tank 102 and the surface level of the liquid 4a in the water tank 102, and the water gate controller 1010 adjusts the liquid 4a introduced to the water tank 102 in accordance with the determined surface level of the liquid 4a. It is thus possible to effectively prevent breakage of the water-repellent particle layer 104 at the concave portion 400 and efficiently and reliably perform automatic desalination.

Second Embodiment

Continuous desalination can possibly increase concentration of impurities dissolved in liquid in the water tank 102 and deposit the impurities on the water-repellent particle layer 104. For example, liquid of the liquid layer 4 is partially evaporated, so that the concentration of the impurities dissolved in the liquid layer 4 is increased and the impurities are deposited and accumulated on the surface of the water-repellent particle layer 104. In short, impurities 2000 are deposited when the concentration of the impurities in the liquid layer 4 exceeds saturated concentration.

Figure 10B:
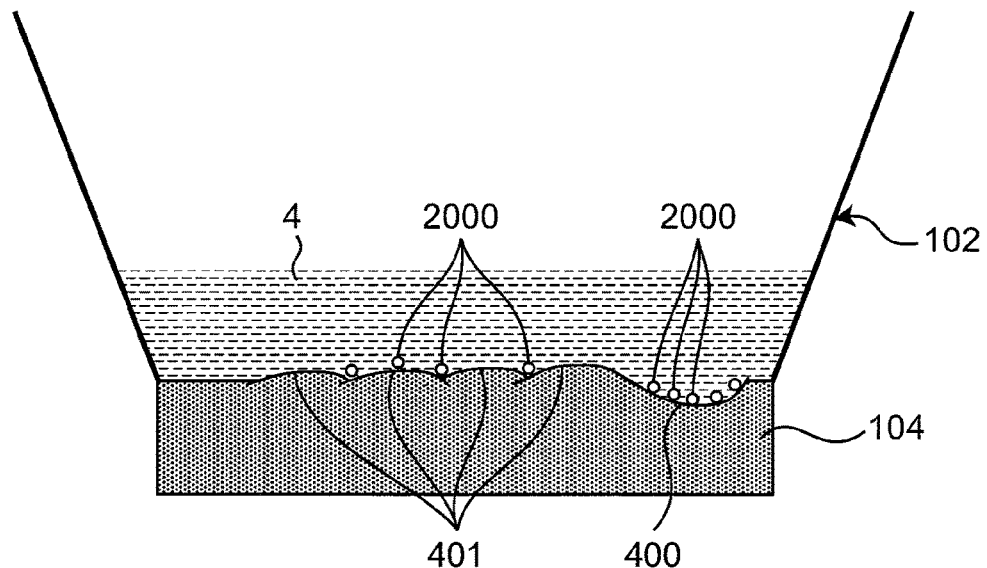
FIG. 10B is a view showing a state where impurities are deposited on a water-repellent particle layer in the desalination system according to the second embodiment.

FIG. 10B shows a state where the impurities 2000 are deposited on the water-repellent particle layer 104. The impurities 2000 are accumulated on the surface of the water-repellent particle layer 104. In this case, the impurities 2000 are deposited and accumulated on a slanted surface of the convex portion 401, a slanted surface of the concave portion 400, and the like, in the surface of the water-repellent particle layer 104. The impurities 2000 accumulated on the slanted surface of the convex portion 401 is assumed to be moved from the slanted surface of the convex portion 401 to the slanted surface of the concave portion 400 due to gravity. The impurities 2000 on the surface of the concave portion 400 are assumed to be relatively more than the impurities 2000 on the surface of the convex portion 401.

Figure 10C:
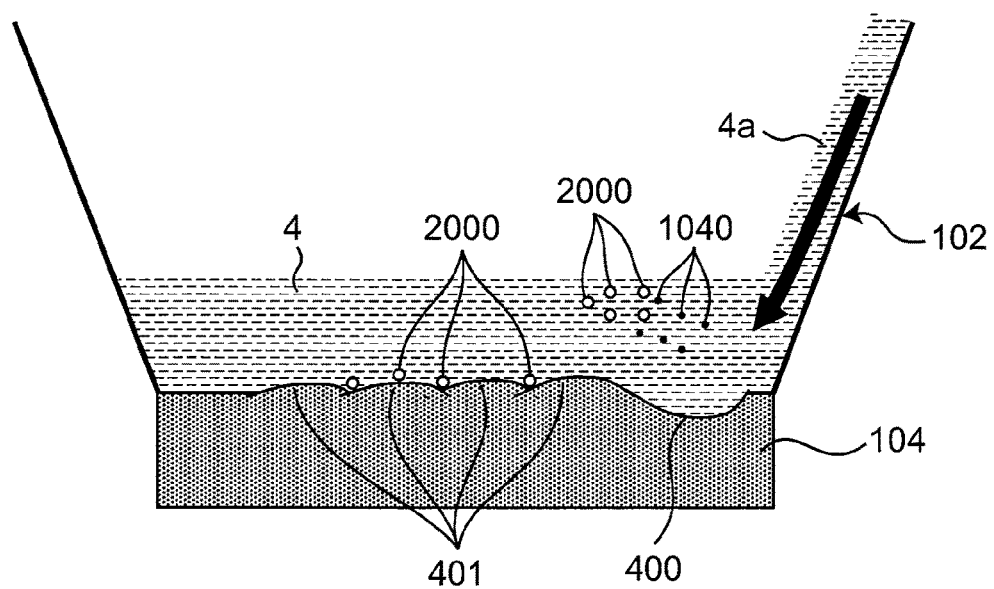
FIG. 10C is a view showing a state where the liquid is introduced to the water tank when impurities are deposited on the water-repellent particle layer in the desalination system according to the second embodiment.

FIG. 10C shows a state where the liquid 4a is introduced to the water tank 102 when the impurities 2000 are deposited on the water-repellent particle layer 104. The flow of the liquid 4a introduced to the water tank 102 shifts the impurities 2000 accumulated on the concave portion 400 in the liquid layer 4, similarly to the water-repellent particles 1040 at the concave portion 400.

Figure 10D:
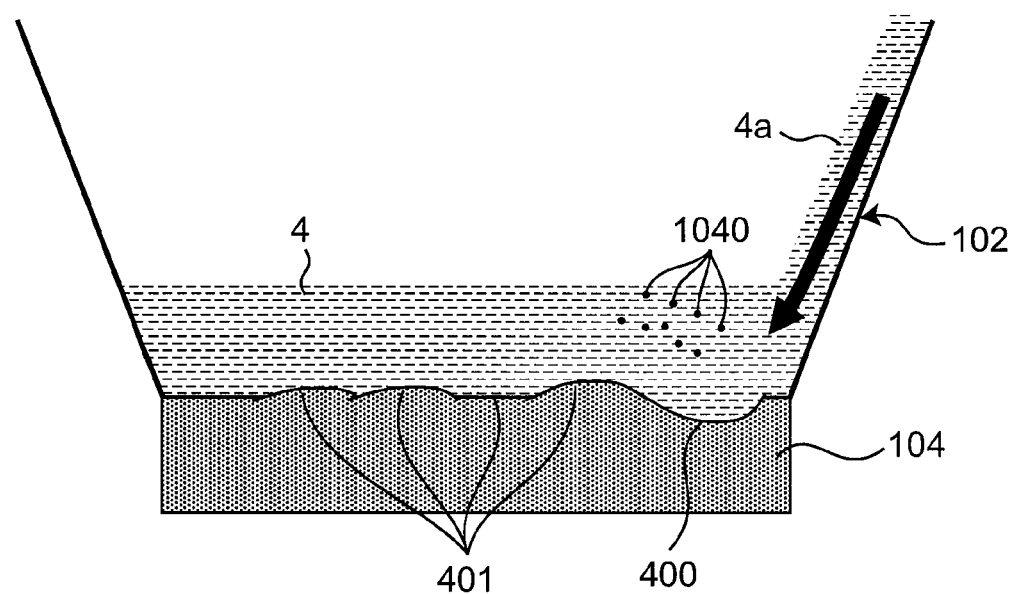
FIG. 10D is a view showing a state where the liquid is introduced to the water tank when no impurities are deposited on the water-repellent particle layer in the desalination system according to the second embodiment.

FIG. 10D shows a state where the liquid 4a is introduced to the water tank 102 when the impurities 2000 are not deposited on the water-repellent particle layer 104. The water-repellent particles 1040 floating in the liquid in the water tank 102 in the state shown in FIG. 10C are smaller in amount than the water-repellent particles 1040 in the state shown in FIG. 10D.

In the state shown in FIG. 10C, the impurities 2000 are deposited on the water-repellent particle layer 104. Accordingly, the impurities 2000 accumulated on the concave portion 400 are shifted in the liquid layer 4 by the flow of the liquid and then the water-repellent particles 1040 at the concave portion 400 are shifted in the liquid layer 4. That is, force generated by the flow of the liquid is applied also for shifting the impurities 2000 at the concave portion 400. The amount of the moving water-repellent particles 1040 at the concave portion 400 is smaller than that of the case where the impurities 2000 are not deposited.

In a desalination system 3 according to the second embodiment, the decision unit 106c acquires, from an impurity deposition information acquiring unit 232 to be described later, information on whether or not the impurities 2000 are deposited, and determines the level of the liquid layer 4 in the water tank 102 in view of the information on whether or not the impurities are deposited. For example, when acquiring from the impurity deposition information acquiring unit 232 information that the impurities 2000 are deposited, the level of the liquid layer 44 in the water tank 102 is adjusted to be higher than the level of the liquid layer 4 in the state where the impurities 2000 are not deposited.

Figure 11A:
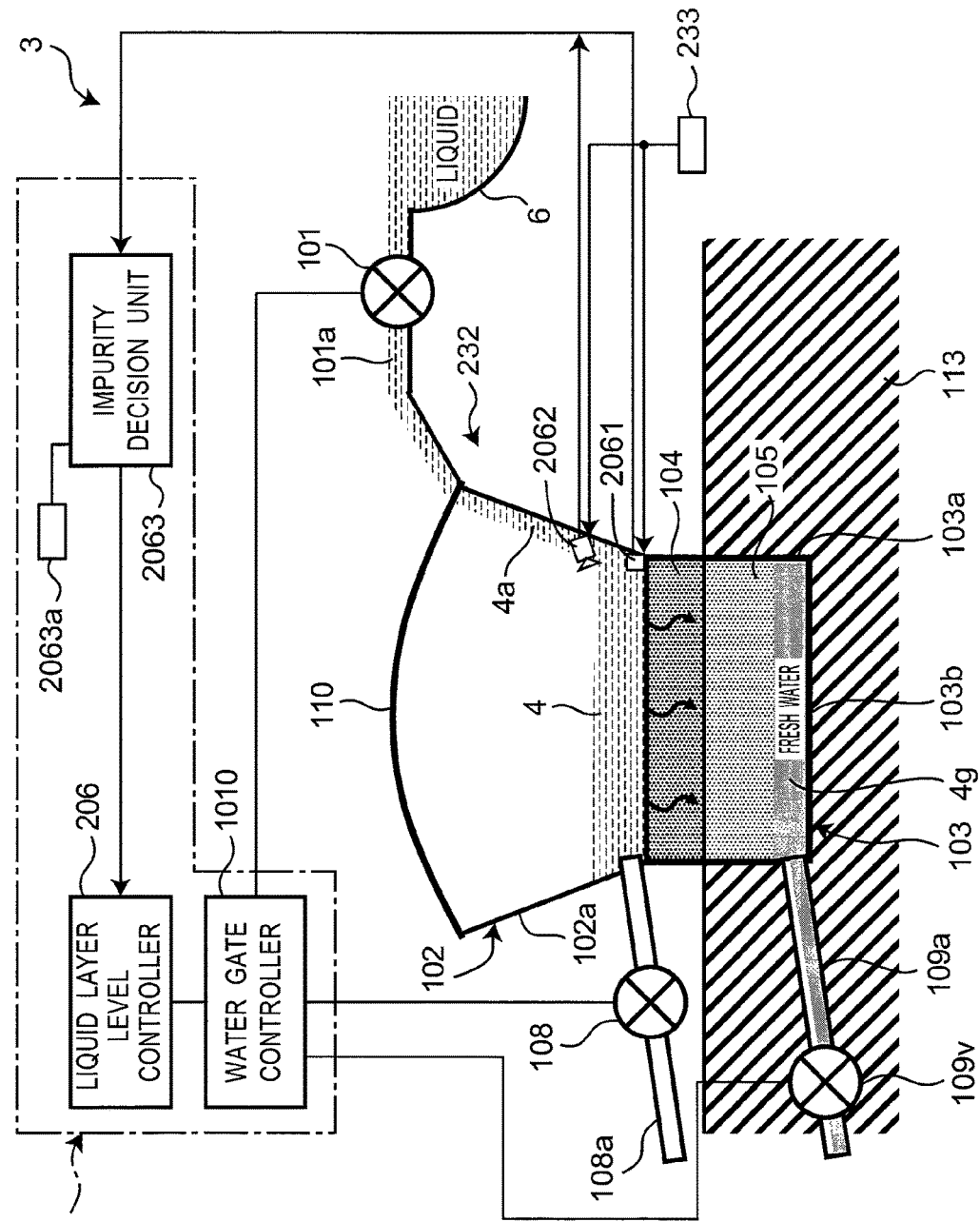
FIG. 11A is a view of the desalination system according to the second embodiment.
Figure 11B:
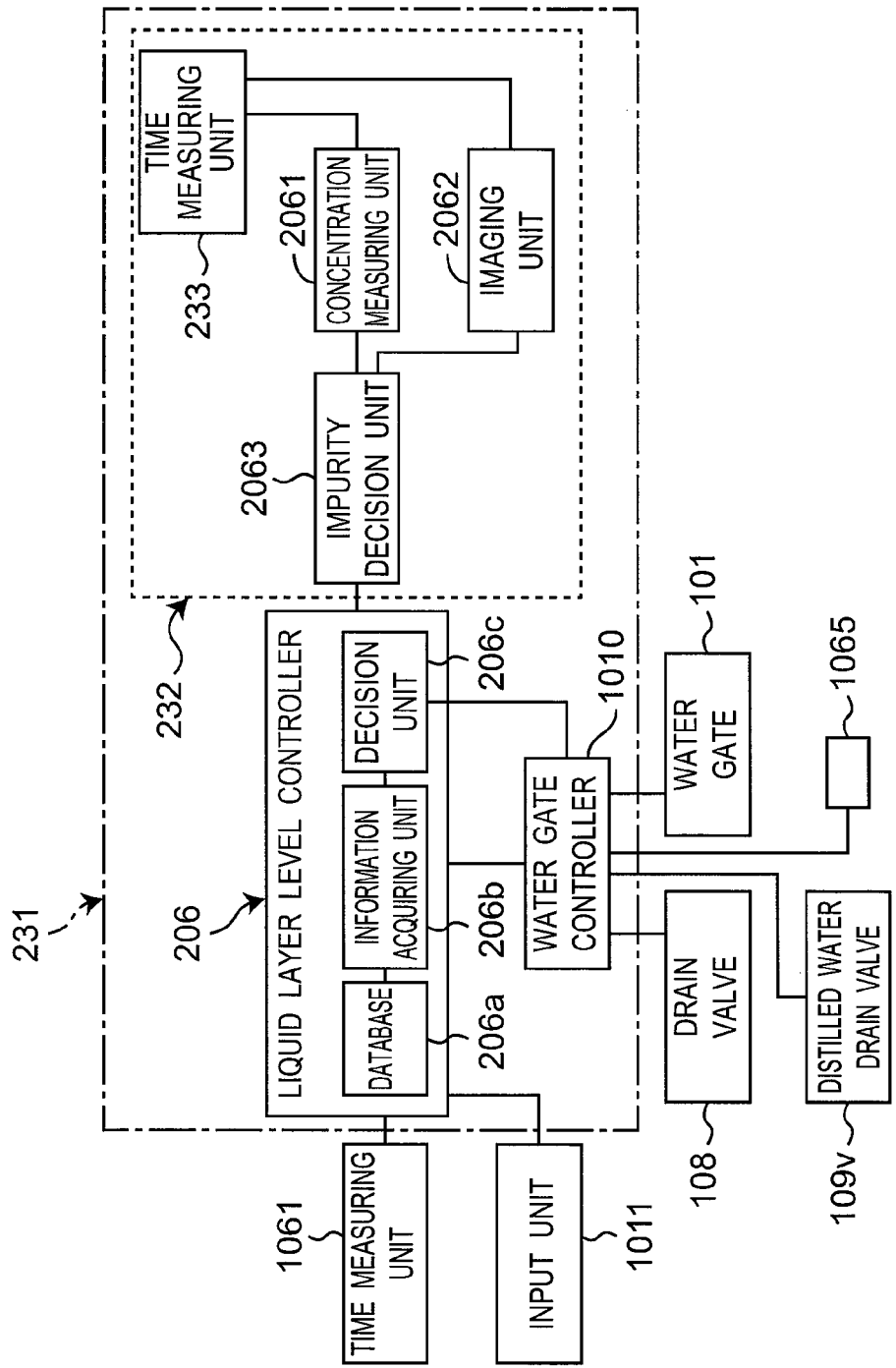
FIG. 11B is a block diagram of constituent elements in the desalination system according to the second embodiment.

FIGS. 11A and 11B each show the desalination system 3 according to the second embodiment. The desalination system 3 shown in FIG. 11A includes the water tank 102, the water-repellent particle layer 104, the devolatilizing layer 105, and a liquid layer adjusting apparatus 231. As shown in FIGS. 11A and 11B, the liquid layer adjusting apparatus 231 in the desalination system 3 includes a liquid layer level controller 206, the water gate controller 1010, the impurity decision unit 2063, either one of a concentration measuring unit 2061 and an imaging unit 2062, and the like.

The liquid layer level controller 206 is configured similarly to the liquid layer level controller 106, and includes a liquid layer level adjusting information database 206a, an information acquiring unit 206b, and a decision unit (liquid layer level determining unit) 206c. The information acquiring unit 206b is connected wiredly or wirelessly to the liquid layer level adjusting information database 206a and the decision unit 206c. The information acquiring unit 206b and the decision unit 206c are each connected wiredly or wirelessly to the water gate controller 1010. The liquid layer level controller 206 is different from the liquid layer level controller 106 only in reference information for decision and decision contents.

The impurity decision unit 2063 is connected wiredly or wirelessly to the concentration measuring unit 2061 or the imaging unit 2062. The exemplified impurity deposition information acquiring unit 232 includes either one of the concentration measuring unit 2061 and the imaging unit 2062, and the impurity decision unit 2063.

The liquid layer adjusting apparatus 231 is also called a liquid layer adjusting system included in the desalination system 3.

<Concentration Measuring Unit 2061>

The concentration measuring unit 2061 measures concentration of the impurities 2000 in the liquid of the liquid layer 4. The concentration measuring unit 2061 can possibly acquire time from a time measuring unit 233 for measuring time and transmit, to the impurity decision unit 2063, the measured concentration of the impurities 2000 associated with the time.

Figure 12A:
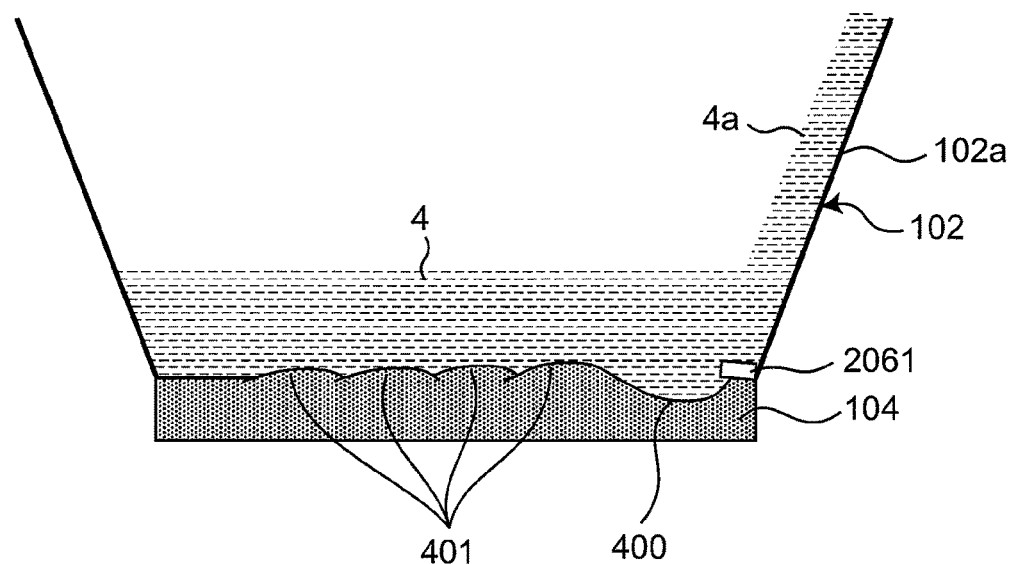
FIG. 12A is a view exemplifying a configuration in which the liquid layer is provided therein with a concentration measuring unit in the desalination system according to the second embodiment.

The concentration measuring unit 2061 is located inside the water tank 102 as well as inside the liquid layer 4. FIG. 12A exemplifies the concentration measuring unit 2061 located in the liquid layer 4. Out of the liquid of the liquid layer 4, liquid located close to the water-repellent particle layer 104 contains impurities of the highest concentration. The concentration measuring unit 2061 is thus located close to the water-repellent particle layer 104, for example. More specifically, the concentration measuring unit 2061 is located in contact with the water-repellent particle layer 104.

<Imaging Unit 2062>

The imaging unit 2062 captures an image of the surface of the water-repellent particle layer 104. The imaging unit 2062 can possibly acquire time from the time measuring unit 233 for measuring time and transmit, to the impurity decision unit 2063, the captured image associated with the time.

Figure 12B:
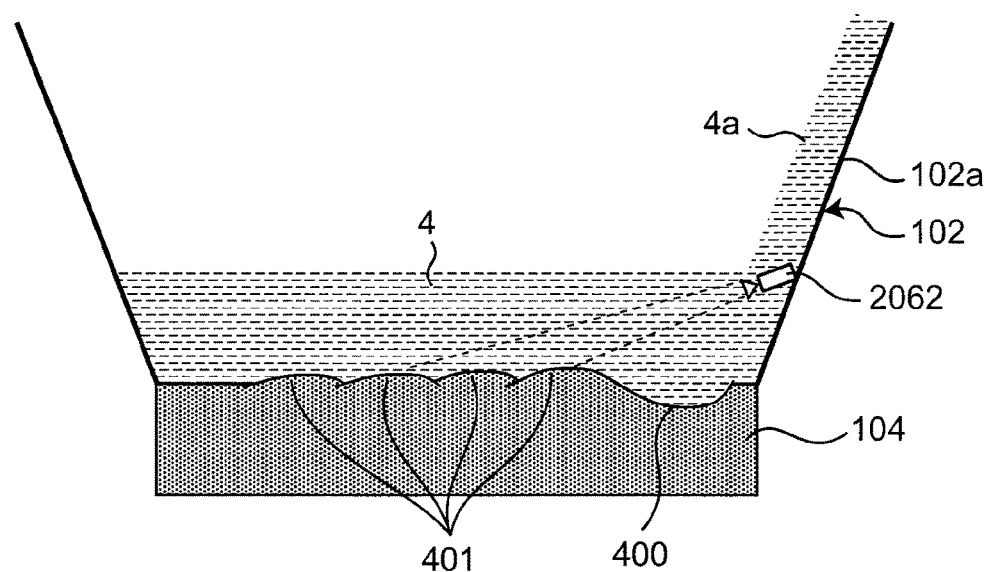
FIG. 12B is a view exemplifying a configuration in which the liquid layer is provided therein with an imaging unit in the desalination system according to the second embodiment.

The imaging unit 2062 is located so as to capture an image of the surface of the water-repellent particle layer 104. More specifically, as shown in FIG. 12B, the imaging unit 2062 is located inside the liquid layer 4 so as to be less influenced by light that is reflected at the surface of the liquid layer 4.

<Impurity Decision Unit 2063>

The impurity decision unit 2063 decides whether or not the impurities 2000 having dissolved in the liquid are deposited on the water-repellent particle layer 104.

The impurity decision unit 2063 decides whether or not concentration of the impurities 2000 measured by the concentration measuring unit 2061 is within a predetermined concentration range. If the measured concentration is within the predetermined concentration range, the impurity decision unit 2063 decides that the impurities 2000 are deposited. If the measured concentration is not within the predetermined concentration range, the impurity decision unit 2063 decides that the impurities 2000 are not deposited. The predetermined concentration range is equal to or covers up to saturated concentration from concentration that is equal to or smaller by a predetermined degree than the saturated concentration. The exemplary predetermined concentration range covers from a concentration lower by 3% than saturated concentration to the saturated concentration.

If the concentration of the liquid layer 4 is within the predetermined concentration range for at least a predetermined period, the impurity decision unit 2063 can decide that the impurities 2000 are deposited. The impurity decision unit 2063 can decide the amount of the deposited impurities 2000 in accordance with the length of the predetermined period as well as with the information on whether or not the impurities 2000 are deposited.

The impurity decision unit 2063 acquires the predetermined concentration range that is stored in a reference storage unit 2063a. The liquid impurity decision unit 2063 itself can include the reference storage unit 2063a (illustrated outside the impurity decision unit 2063 in FIG. 11A for better comprehension), or the impurity decision unit 2063 can acquire the predetermined concentration range from the reference storage unit that is provided externally. The reference storage unit 2063a can store the predetermined period in addition to the predetermined concentration range.

The impurity decision unit 2063 decides whether or not the impurities 2000 are contained in accordance with the image captured by the imaging unit 2062. The impurity decision unit 2063 decides whether or not the impurities 2000 are contained in accordance with whether or not the captured image includes color of the impurities 2000 preliminarily dissolved in the liquid. The impurity decision unit 2063 can refer to brightness information when the impurities 2000 and the water-repellent particles have the same color.

The impurity decision unit 2063 can decide the amount of the deposited impurities 2000 in accordance with the amount of the impurities 2000 in the captured image. The amount of the impurities 2000 in the captured image can be expressed by a ratio of the impurities 2000 to the image or an area of the impurities 2000.

The impurity decision unit 2063 acquires predetermined color or brightness of the impurities 2000 that is stored in the reference storage unit 2063a. The impurity decision unit 2063 can include the reference storage unit 2063a (illustrated outside the impurity decision unit 2063 in FIG. 11A for better comprehension), or the impurity decision unit 2063 can acquire color or brightness of the impurities 2000 in a predetermined image from the external reference storage unit. The reference storage unit 2063a can store, in addition to predetermined color or brightness of the impurities 2000, a predetermined ratio of the impurities 2000 or a predetermined area of the impurities 2000.

<Liquid Layer Level Controller 206>

The liquid layer level controller 206 acquires, from the impurity decision unit 2063, information on whether or not the impurities 2000 having dissolved in the liquid are deposited on the water-repellent particle layer 104, estimates the depth of the concave portion 400 at the water-repellent particle layer 104 formed by introduction of the liquid 4a to the water tank 102 in accordance with the acquired information on whether or not the impurities are deposited, and determines the level of the liquid layer 4 in the water tank 102.

For example, the impurity decision unit 2063 can acquire concentration information from the concentration measuring unit 2061 for measuring a concentration of liquid and decide whether or not there are the impurities, and then, the liquid layer level controller 206 can acquire information thereon. If the concentration measured by the concentration measuring unit 2061 is equal to a saturated concentration at least for a predetermined period, the impurity decision unit 2063 decides that the impurities 2000 are deposited. Alternatively, the imaging unit 2062 captures an image of the surface of the water-repellent particle layer 104 and the impurity decision unit 2063 decides whether or not there are impurities in accordance with the captured image.

For example, the impurity decision unit 2063 preliminarily stores sizes or shapes of the deposited impurities 2000 as information on the impurities 2000. The impurity decision unit 2063 analyzes the captured image and acquires information on whether or not the impurities 2000 are deposited. The impurity decision unit 2063 can preliminarily store a shape of a particle forming the water-repellent particle layer 104, to decide that the impurities 2000 are deposited when a lump of a different shape is detected. The impurity decision unit 2063 can alternatively obtain the amount of the impurities 2000 from the number or the area of the deposited impurities 2000 in the image captured by the imaging unit 2062.

The decision unit 206c in the liquid layer level controller 206 changes the information on the relationship between the information corresponding to the number of times of introducing the liquid to the water tank 102 and the level of the liquid of the liquid layer 4 in accordance with the decision information on whether or not the impurities 2000 are deposited as decided by the impurity decision unit 2063, and then, determines the level of the liquid layer 4. For example, if the impurity decision unit 2063 decides that the impurities 2000 are deposited, the liquid layer level controller 206 controls the water gate controller 1010 so as to increase the level of the liquid in comparison to the case where the impurities 2000 are not deposited. If a large amount of impurities 2000 are deposited on the water-repellent particle layer 104, a movement amounts of water-repellent particles are decreased and the concave portion 400 formed by introduction of the liquid 4a to the water tank 102 is less deeper than the concave portion 400 formed by introduction of the liquid 4a to the water tank 102 in a case where the impurities 2000 are not deposited on the water-repellent particle layer 104. It is thus possible to increase the level of the liquid. In contrast, if the impurity decision unit 2063 decides that the impurities 2000 are not deposited, the decision unit 206c in the liquid layer level controller 206 does not change the level of the liquid. The decision information on whether or not the impurities 2000 are deposited is not necessarily binary information. When the impurity decision unit 2063 decides that the impurities 2000 are deposited, the decision unit 206c in the liquid layer level controller 206 can decide the level of the liquid layer 4 in accordance with the amount of the deposited impurities 2000.

<Liquid Layer Level Adjustment>

Figure 13:
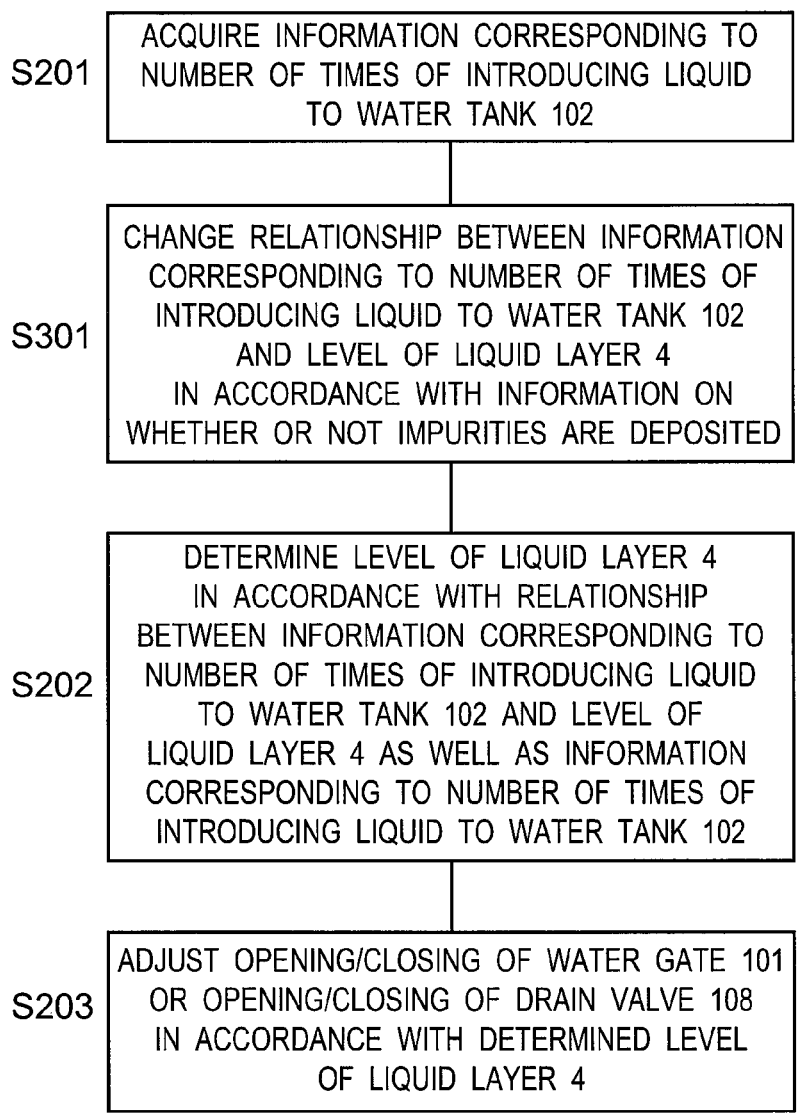
FIG. 13 is a flowchart of liquid layer level adjustment steps by a liquid layer adjusting apparatus in the desalination system according to the second embodiment.

FIG. 13 is a flowchart of liquid layer level adjustment by the liquid layer adjusting apparatus 231 in the desalination system 3.

<Step S201>

The information acquiring unit 206b in the liquid layer level controller 206 initially causes the water gate controller 1010 to open the water gate 101 and acquires information corresponding to the number of times of introducing the liquid 4a to the water tank 102, from the water gate controller 1010. As described above, examples of the information corresponding to the number of times of introducing the liquid 4a to the water tank 102 include the number of times of opening/closing the water gate 101 or the elapsed time from formation of the liquid layer 4. The information acquiring unit 206b in the liquid layer level controller 206 acquires the information from the water gate controller 1010.

<Step S301>

The decision unit 206c in the liquid layer level controller 206 subsequently acquires from the impurity deposition information acquiring unit 232 information on whether or not the impurities 2000 are deposited, and changes as necessary, in accordance with the acquired information, the information on the relationship between the information corresponding to the number of times of introducing the liquid to the water tank 102 and the level of the liquid layer 4, which is stored in the database 206a or the external storage unit and read out by the decision unit 206c. For example, when acquiring from the impurity deposition information acquiring unit 232 information that the impurities 2000 are not deposited in the liquid layer 4, the decision unit 206c in the liquid layer level controller 206 does not change the relationship information. In contrast, when acquiring from the impurity deposition information acquiring unit 232 information that the impurities 2000 are deposited in the liquid layer 4, the decision unit 206c in the liquid layer level controller 206 changes the relationship information as described above.

<Step S202>

The decision unit 206c in the liquid layer level controller 206 subsequently determines the level of the liquid layer 4 in accordance with the information, which is changed in step S301 or is not changed with no necessity, on the relationship between the information corresponding to the number of times of introducing the liquid to the water tank 102 and the level of the liquid layer 4 and the acquired information corresponding to the number of times of introducing the liquid to the water tank 102. More specifically, when changed in step S301, the decision unit 206c refers to the information on the relationship between the number of times and the level as changed in step S301 to determine the level of the liquid layer 4 in accordance with the number of times of introducing the liquid 4a to the water tank 102 as acquired by the information acquiring unit 206b. When not changed in step S301, the decision unit 206c refers to the information on the relationship between the number of times and the level as stored in the database 206a or the external storage unit to determine the level of the liquid layer 4 in accordance with the number of times of introducing the liquid 4a to the water tank 102 that is acquired by the information acquiring unit 206b.

<Step S203>

The decision unit 206c subsequently transmits a command to the water gate controller 1010 in order to adjust opening/closing of the water gate 101 or opening/closing of the drain valve 108 in accordance with the level of the liquid layer 4 determined by the decision unit 206c. Upon receipt of the command from the decision unit 206c, the water gate controller 1010 adjusts opening/closing of the water gate 101 in accordance with the level of the liquid layer 4 determined by the decision unit 206c. More specifically, for example, the decision unit 206c calculates the period of opening the water gate 101 until the liquid layer 4 reaches the level determined by the decision unit 206c, and controls the water gate controller 1010 to open the water gate 101 during the calculated period.

It is thus possible to effectively prevent breakage of the water-repellent particle layer 104 at the concave portion 400 and efficiently and reliably perform automatic desalination.

According to the second embodiment, when acquiring from the impurity deposition information acquiring unit 232 the information that the impurities 2000 are deposited in the liquid layer 4, the decision unit 206c in the liquid layer level controller 206 determines the level of the liquid 4a introduced to the water tank 102 in view of the acquired information on whether or not the impurities are deposited, in accordance with the information on the relationship between the information corresponding to the amount of the liquid 4a introduced to the water tank 102 and the surface level of the liquid 4a in the water tank 102, and the water gate controller 1010 adjusts the liquid 4a introduced to the water tank 102 in accordance with the determined surface level of the liquid 4a. It is thus possible to effectively prevent breakage of the water-repellent particle layer 104 at the concave portion 400 and more efficiently and more reliably perform automatic desalination.

Third Embodiment

The liquid 4a can be possibly heated partially to be water-evaporated while the liquid 4a is flowing in the water tank 102. The liquid 4a temporarily exceeds a saturated concentration, so that the impurities 2000 are deposited in the introduction path 101a. The flow of the liquid 4a is changed by the impurities 2000 that are deposited in the introduction path 101a used for introducing the liquid 4a to the water tank 102, and the flow of the liquid 4a introduced to the water tank 102 is also changed. More specifically, if a large amount of impurities 2000 are deposited in the introduction path 101a, a less amount of liquid 4a flows in the introduction path 101a.

In a desalination system 7 according to the third embodiment, an introduction path impurity deposition information acquiring unit 332 acquires information on whether or not the impurities 2000 are deposited in the introduction path 101a, and the decision unit 106c determines the level of the liquid layer 4 in accordance with the acquired information. For example, when acquiring from the introduction path impurity deposition information acquiring unit 332 information that the impurities 2000 are deposited, the level of the liquid layer 4 in the water tank 102 is adjusted to be higher than the level of the liquid layer 4 in the state where the impurities 2000 are not deposited.

Figure 14B:
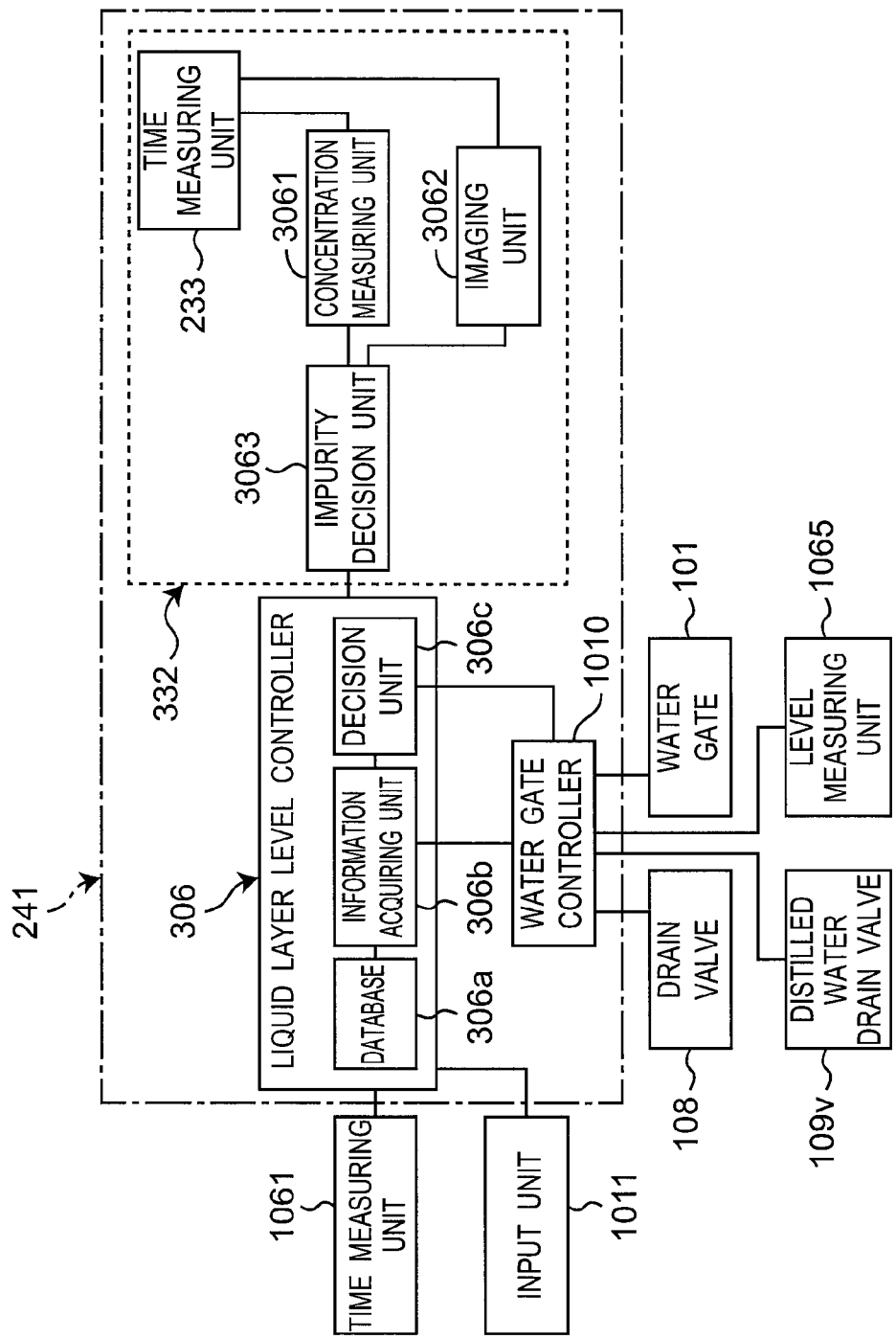
FIG. 14B is a block diagram of constituent elements in the desalination system according to the third embodiment.

FIGS. 14A and 14B each show the desalination system 7 according to the third embodiment. The desalination system 7 includes the water tank 102, the water-repellent particle layer 104, the devolatilizing layer 105, and a liquid layer adjusting apparatus 241. The liquid layer adjusting apparatus 241 in the desalination system 7 includes a liquid layer level controller 306, the water gate controller 1010, an impurity decision unit 3063, either one of a concentration measuring unit 3061 and an imaging unit 3062, and the like.

The liquid layer level controller 306 is configured similarly to the liquid layer level controller 106, and includes a liquid layer level adjusting information database 306a, an information acquiring unit 306b, and a decision unit (liquid layer level determining unit) 306c. The information acquiring unit 306b is connected to the liquid layer level adjusting information database 306a and the decision unit 306c. The information acquiring unit 306b and the decision unit 306c are each connected to the water gate controller 1010. The liquid layer level controller 306 is different from the liquid layer level controller 106 only in reference information for decision and decision contents.

The impurity decision unit 3063 is connected wiredly or wirelessly to the concentration measuring unit 3061 or the imaging unit 3062. The exemplified impurity deposition information acquiring unit 332 includes either one of the concentration measuring unit 3061 and the imaging unit 3062, and the impurity decision unit 3063.

The liquid layer adjusting apparatus 241 is also called a liquid layer adjusting system included in the desalination system 7.

<Concentration Measuring Unit 3061>

The concentration measuring unit 3061 measures concentration of the impurities 2000 in the liquid 4a flowing in the introduction path 101a. The concentration measuring unit 3061 can possibly acquire time from a time measuring unit 233 for measuring time and transmit, to the impurity decision unit 3063, the measured concentration of the impurities 2000 associated with the time.

As shown in FIG. 14A, the concentration measuring unit 3061 is located in the introduction path 101a. In an example, the concentration measuring unit 3061 is located in the introduction path 101a at a portion or in the vicinity thereof for introducing liquid to the water tank 102.

<Imaging Unit 3062>

The imaging unit 3062 captures an image of the liquid 4a flowing in the introduction path 101a. The imaging unit 3062 can possibly acquire time from the time measuring unit 233 for measuring time and transmit, to the impurity decision unit 3063, the captured image associated with the time.

As shown in FIG. 14A, the imaging unit 3062 is located in the introduction path 101a so as to capture an image of a flow of the liquid 4a in the introduction path 101a along the introduction path 101a. For example, the imaging unit 3062 is located along the introduction path 101a at a portion close to the water gate 101 in the introduction path 101a toward the water tank 102, so as to capture an image of a state of the liquid 4a flowing in the introduction path 101a from the water gate 101 toward the water tank 102. In an example, a member of the introduction path 101a is made different in color from the liquid and the impurities 2000, so that the impurities 2000 can be easily detected in the captured image.

<Impurity Decision Unit 3063>

The impurity decision unit 3063 decides whether or not the impurities 2000 having dissolved in the liquid 4a are deposited in the introduction path 101a.

The impurity decision unit 3063 decides whether or not concentration of the impurities 2000 measured by the concentration measuring unit 3061 is within a predetermined concentration range. If the measured concentration is within the predetermined concentration range, the impurity decision unit 3063 decides that the impurities 2000 are deposited. If the measured concentration is not within the predetermined concentration range, the impurity decision unit 3063 decides that the impurities 2000 are not deposited. The predetermined concentration range covers up to a saturated concentration from concentration that is smaller by a predetermined degree than the saturated concentration. The exemplary predetermined concentration range covers from a concentration lower by 3% than a saturated concentration to the saturated concentration.

If the concentration of the liquid layer 4 is within the predetermined concentration range for at least a predetermined period, the impurity decision unit 3063 can decide that the impurities 2000 are deposited. The impurity decision unit 3063 can decide the amount of the deposited impurities in accordance with the length of the predetermined period as well as with the information on whether or not the impurities 2000 are deposited.

The impurity decision unit 3063 acquires the predetermined concentration range that is stored in a reference storage unit 3063a. The liquid impurity decision unit 3063 itself can include the reference storage unit 3063a (illustrated outside the impurity decision unit 3063 in FIG. 14A for better comprehension), or the impurity decision unit 3063 can acquire the predetermined concentration range from the reference storage unit that is provided externally. The reference storage unit 3063a can store the predetermined period in addition to the predetermined concentration range.

The impurity decision unit 3063 alternatively decides whether or not the impurities 2000 are contained in accordance with the image captured by the imaging unit 3062. The impurity decision unit 3063 decides whether or not the impurities 2000 are contained in accordance with whether or not the captured image includes color of the impurities 2000 preliminarily dissolved in the liquid 4a. The impurity decision unit 3063 can refer to brightness information when the impurities 2000 and the water-repellent particles have the same color.

The impurity decision unit 3063 can decide the amount of the deposited impurities 2000 in accordance with the amount of the impurities 2000 in the captured image. The amount of the impurities 2000 in the captured image can be expressed by a ratio of the impurities 2000 to the image or an area of the impurities.

The impurity decision unit 3063 acquires predetermined color or brightness of the impurities 2000 that is stored in the reference storage unit 3063a. The impurity decision unit 3063 can include the reference storage unit 3063a (illustrated outside the impurity decision unit 3063 in FIG. 14A for better comprehension), or the impurity decision unit 3063 can acquire color or brightness of the impurities 2000 in a predetermined image from the external reference storage unit. The reference storage unit 3063a can store a predetermined ratio of the impurities 2000 or a predetermined area of the impurities in addition to predetermined color or brightness of the impurities 2000.

<Liquid Layer Level Controller 306>

The liquid layer level controller 306 acquires, from the impurity decision unit 3063, information on whether or not the impurities 2000 having dissolved in the liquid 4a are deposited in the introduction path 101a, estimates the depth of the concave portion 400 at the water-repellent particle layer 104 formed by the changed flow of the liquid 4a due to deposition of the impurities 2000 in the introduction path 101a in accordance with the acquired information on whether or not the impurities are deposited, and determines the level of the liquid layer 4 in the water tank 102.

For example, the impurity decision unit 3063 can acquire concentration information from the concentration measuring unit 3061 for measuring concentration of liquid and then, decide whether or not there are the impurities, and thereafter, the liquid layer level controller 306 can acquire information thereon. If the concentration measured by the concentration measuring unit 3061 is equal to a saturated concentration at least for a predetermined period, the impurity decision unit 3063 decides that the impurities 2000 are deposited. Alternatively, the imaging unit captures a flow of the liquid 4a in the introduction path 101a and the impurity decision unit 3063 decides whether or not there are impurities in accordance with the captured image.

For example, the impurity decision unit 3063 preliminarily stores sizes or shapes of the deposited impurities 2000 as information on the impurities 2000. The impurity decision unit 3063 analyzes the captured image and the impurity decision unit 2063 acquires information on whether or not the impurities 2000 are deposited. The impurity decision unit 3063 can preliminarily store a shape of a particle forming the water-repellent particle layer 104, to determine that the impurities 2000 are deposited when a lump of a different shape is detected. The imaging unit 3062 can alternatively capture an image to obtain the amount of the impurities 2000 from the number or the area of the deposited impurities 2000 in the image captured by the imaging unit 3062.

The decision unit 306c in the liquid layer level controller 306 changes the information on the relationship between the information corresponding to the number of times of introducing the liquid to the water tank 102 and the level of the liquid of the liquid layer 4 in accordance with the decision information on whether or not the impurities 2000 are deposited as decided by the impurity decision unit 3063, and determines the level of the liquid layer 4. For example, if the impurity decision unit 3063 decides that the impurities 2000 are deposited, the liquid layer level controller 306 controls the water gate controller 1010 so as to increase the level of the liquid in comparison to the case where the impurities 2000 are not deposited. When a large amount of impurities 2000 are deposited in the introduction path 101a, the liquid 4a introduced to the water tank 102 is smaller in amount than the liquid 4a introduced to the water tank 102 in the case where the impurities 2000 are not deposited in the introduction path 101a. The concave portion 400 formed at the water-repellent particle layer 104 is thus decreased in depth and the liquid can be increased in level. In contrast, if the impurity decision unit 3063 decides that the impurities 2000 are not deposited, the decision unit 306c in the liquid layer level controller 306 does not change the level of the liquid. The decision information on whether or not the impurities 2000 are deposited is not necessarily binary information. When the impurity decision unit 2063 decides that the impurities 2000 are deposited, the decision unit 306c in the liquid layer level controller 306 can determine the level of the liquid layer 4 in accordance with the amount of the deposited impurities 2000.

<Liquid Layer Level Adjustment>

The steps of liquid layer level adjustment by the liquid layer adjusting apparatus 241 are similar, as to be described below, to those of the liquid layer level adjustment by the liquid layer adjusting apparatus 231 in the desalination system 3 according to the second embodiment as illustrated in FIG. 13. These steps are thus described with reference to FIG. 13.

<Step S201>

The information acquiring unit 306b in the liquid layer level controller 306 causes the water gate controller 1010 to open the water gate 101 and acquires information corresponding to the number of times of introducing the liquid 4a to the water tank 102 from the water gate controller 1010. As described above, examples of the information corresponding to the number of times of introducing the liquid 4a to the water tank 102 include the number of times of opening/closing the water gate 101 and the elapsed time from formation of the liquid layer 4. The information acquiring unit 306b in the liquid layer level controller 306 acquires the information from the water gate controller 1010.

<Step S301>

The decision unit 306c in the liquid layer level controller 306 subsequently acquires from the impurity deposition information acquiring unit 332 information on whether or not the impurities 2000 are deposited, and changes as necessary, in accordance with the acquired information, the information on the relationship between the information corresponding to the number of times of introducing the liquid to the water tank 102 and the level of the liquid layer 4, which is stored in the database 306a and read out by the decision unit 306c. For example, when acquiring from the impurity deposition information acquiring unit 332 information that the impurities 2000 are not deposited in the introduction path 101a, the decision unit 306c in the liquid layer level controller 306 does not change the relationship information. In contrast, when acquiring from the impurity deposition information acquiring unit 332 information that the impurities 2000 are deposited in the introduction path 101a, the decision unit 306c in the liquid layer level controller 306 changes the relationship information as described above.

<Step S202>

The decision unit 306c in the liquid layer level controller 306 subsequently determines the level of the liquid layer 4 in accordance with the information, which is changed in step S301 or is not changed with no necessity, on the relationship between the information corresponding to the number of times of introducing the liquid to the water tank 102 and the acquired information corresponding to the number of times of introducing the liquid to the water tank 102. More specifically, when changed in step S301, the decision unit 306c refers to the information on the relationship between the number of times and the level as changed in step S301 to determine the level of the liquid layer 4 in accordance with the number of times of introducing the liquid 4a to the water tank 102 that is acquired by the information acquiring unit 306b. When not changed in step S301, the decision unit 306c refers to the information on the relationship between the number of times and the level that is stored in the database 306a to determine the level of the liquid layer 4 in accordance with the number of times of introducing the liquid 4a to the water tank 102 that is acquired by the information acquiring unit 306b.

<Step S203>

The decision unit 306c subsequently transmits a command to the water gate controller 1010 in order to adjust opening/closing of the water gate 101 or opening/closing of the drain valve 108 in accordance with the level of the liquid layer 4 determined by the decision unit 306c. Upon receipt of the command from the decision unit 306c, the water gate controller 1010 adjusts opening/closing of the water gate 101 in accordance with the level of the liquid layer 4 determined by the decision unit 306c. More specifically, for example, the decision unit 306c calculates the time of opening the water gate 101 until the liquid layer 4 reaches the level determined by the decision unit 306c, and controls the water gate controller 1010 to open the water gate 101 during the calculated time.

It is thus possible to effectively prevent breakage of the water-repellent particle layer 104 at the concave portion 400 and efficiently and reliably perform automatic desalination.

According to the third embodiment, when acquiring from the introduction path impurity deposition information acquiring unit 332 the information that the impurities 2000 are deposited in the introduction path 101a, the decision unit 306c in the liquid layer level controller 306 determines the level of the liquid 4a introduced to the water tank 102 in accordance with the information on the relationship between the information corresponding to the introduction amount of the liquid 4a introduced to the water tank 102 and the surface level of the liquid 4a in the water tank 102, and the water gate controller 1010 adjusts the liquid 4a introduced to the water tank 102 in accordance with the determined surface level of the liquid 4a. It is thus possible to effectively prevent breakage of the water-repellent particle layer 104 at the concave portion 400 and more efficiently and more reliably perform automatic desalination.

Other Embodiments

Figure 15:
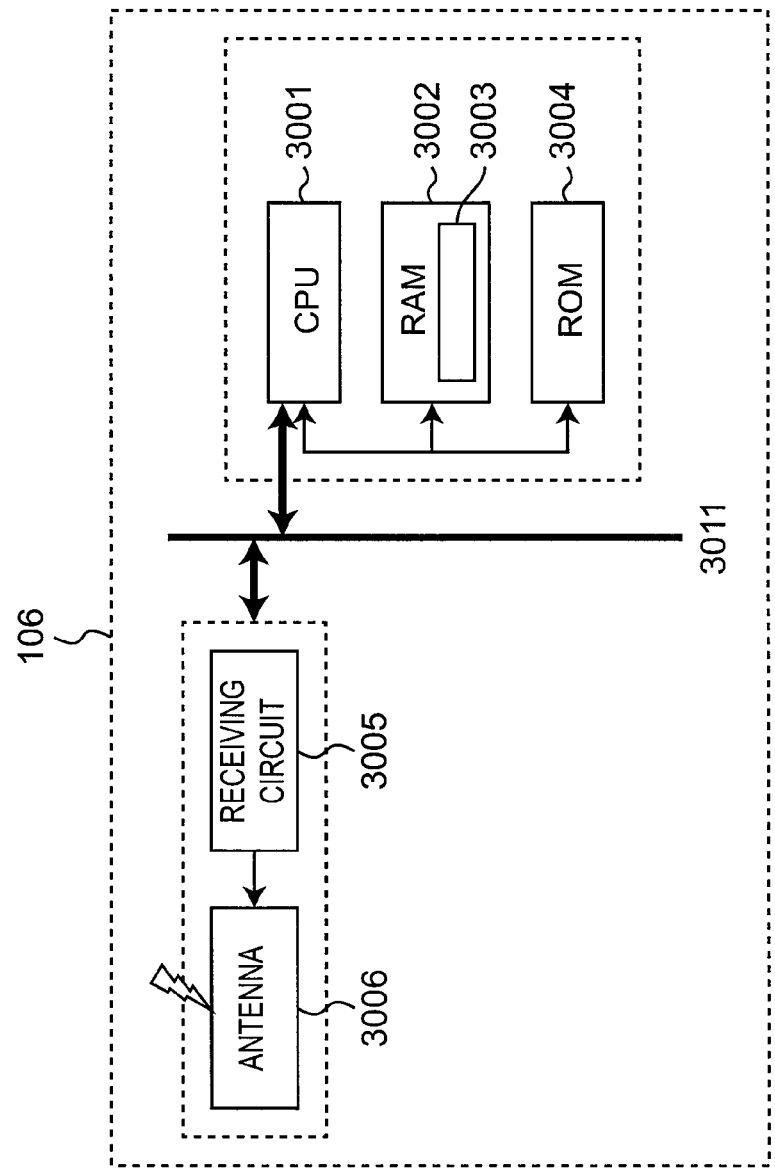
FIG. 15 is a view exemplifying a hardware configuration of the liquid layer level controller in the liquid layer adjusting apparatus in the desalination system according to the first embodiment.

FIG. 15 exemplifies a hardware configuration of the liquid layer level controller 106 in the liquid layer adjusting apparatus 203. The liquid layer level controller 106 includes an antenna 3006, a receiving circuit 3005, and a CPU 3001. For example, the antenna 3006 receives information transmitted from an antenna of the water gate controller 1010, and the receiving circuit 3005 receives the information. The receiving circuit 3005 and the CPU 3001 are connected to each other by a bus 3011 so as to transmit and receive data therebetween. The information received from the water gate controller 1010 is transmitted from the receiving circuit 3005 to the CPU 3001 by way of the bus 3011.

The CPU 3001 configuring the liquid layer level controller 106 executes a program 3003 stored in a RAM 3002. The program 3003 includes a processing procedure illustrated in the flowchart of FIG. 8 or the like. The program 3003 can be alternatively stored in a ROM 3004.

The liquid layer level controller 206 or 306 is configured similarly to the liquid layer level controller 106. The program 3003 includes a processing procedure illustrated in FIG. 13 or the like instead of FIG. 8.

Though the present disclosure has been described above based on the above first to third embodiments, the present disclosure should not be limited to the above-described first to third embodiments. For example, the present disclosure also includes the following cases.

Part or entirety of each of the above-described controllers (control devices) is actually a computer system that includes, for example, a microprocessor, ROM, RAM, hard disk unit, display unit, keyboard, mouse, and the like. A computer program is stored on the RAM or the hard disk unit. Functions of each of the controllers (control devices) can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the desalination system according to each of the above-mentioned embodiments is a following program. That is, such a program for the desalination system is a program for the desalination system, causing a computer to function as:

a liquid level controller that determines a level of the liquid introduced to the water tank in accordance with information on relationship between information corresponding to an amount of the liquid introduced to the water tank and a surface level of the liquid in the water tank; and an introduced amount controller that adjusts the amount of the liquid introduced to the water tank in accordance with the determined surface level of the liquid.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

INDUSTRIAL APPLICABILITY

In the desalination system and the desalination method according to the present disclosure, the level of the liquid introduced to the water tank is determined in accordance with the information on the relationship between the information corresponding to the amount of the liquid introduced to the water tank and the surface level of the liquid in the water tank, so as to previously prevent breakage of the water-repellent particle layer and efficiently and reliably perform automatic desalination. The desalination system and the desalination method are applicable to a desalination system for desalinating liquid and a method thereof, for example.

The entire disclosure of Japanese Patent Application No. 2013-007554 filed on Jan. 18, 2013, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:
1. A desalination system comprising:
a water tank;
a water-repellent particle layer located in the water tank and composed of water-repellent particles; and
a devolatilizing layer located below the water-repellent particle layer, wherein liquid is introduced to the water tank,
the introduced liquid is heated to be evaporated into water vapor, and
the water vapor passes through the water-repellent particle layer and then, is liquefied at the devolatilizing layer to obtain fresh water from the liquid,
the desalination system further comprises:
a liquid level controller that determines a level of the liquid introduced to the water tank in accordance with a pre-stored relationship between information corresponding to an amount of the liquid introduced to the water tank and a surface level of the liquid in the water tank; and
an introduced amount controller that adjusts the amount of the liquid introduced to the water tank in accordance with the determined surface level of the liquid.

2. The desalination system according to claim 1, further comprising:
an impurity deposition information acquiring unit that acquires information on whether or not impurities are deposited from the liquid, wherein
the liquid level controller comprises a decision unit that determines a level of the liquid so that a level of the liquid in the water tank in a case where the impurities are deposited is higher than a level of the liquid in a case where the impurities are not deposited, in accordance with the information from the impurity deposition information acquiring unit.

3. The desalination system according to claim 1, further comprising:
an impurity deposition information acquiring unit that acquires information on whether or not impurities are deposited from the liquid, wherein
the liquid level controller comprises a decision unit that determines a level of the liquid so that a level of the liquid in the water tank in a case where the impurities are deposited is higher than a level of the liquid in a case where the impurities are not deposited, in accordance with the information from the impurity deposition information acquiring unit.

4. The desalination system according to claim 3, wherein the impurity deposition information acquiring unit comprises:
an imaging unit that captures an image of a surface of the water-repellent particle layer in the liquid and outputs the captured image associated with time; and
an impurity decision unit that decides whether or not the impurities are deposited from the liquid in accordance with the image captured and outputted from the imaging unit.

5. The desalination system according to claim 3, wherein the impurity deposition information acquiring unit is configured to acquire information on whether or not impurities are deposited in the introduction path used for introducing the liquid to the water tank, and
the decision unit is configured to adjust, when acquiring information from the impurity deposition information acquiring unit that the impurities are deposited, a level of the liquid in the water tank so as to be higher than a level of the liquid in a case where the impurities are not deposited.

6. The desalination system according to claim 5, wherein the impurity deposition information acquiring unit comprises:
a concentration measuring unit that measures concentration of the impurities in the liquid flowing in the introduction path and outputs, to the impurity deposition information acquiring unit, the measured concentration of the impurities associated with time; and
an impurity decision unit that decides whether or not the impurities are deposited from the liquid in accordance with the concentration of the impurities as outputted from the concentration measuring unit.

7. The desalination system according to claim 5, wherein the impurity deposition information acquiring unit comprises:
an imaging unit that captures an image of the liquid flowing in the introduction path and outputs, to the impurity deposition information acquiring unit, the captured image of the liquid associated with time; and
an impurity decision unit that decides whether or not the impurities are deposited from the liquid in accordance with the image of the liquid as outputted from the imaging unit.

8. A liquid amount adjusting apparatus included in a desalination system comprising:
a water tank for containing liquid;
a water-repellent particle layer located in at a lower portion of the water tank and composed of water-repellent particles; and
a devolatilizing layer located below the water-repellent particle layer, the liquid adjusting apparatus comprising:
a liquid level determining unit that determines a level of the liquid introduced to the water tank in accordance with a pre-stored relationship between information corresponding to an amount of the liquid introduced to the water tank and a surface level of the liquid in the water tank; and
an introduced amount controller that adjusts the amount of the liquid introduced to the water tank in accordance with the determined surface level of the liquid.

9. A desalination method for obtaining fresh water from liquid using a desalination apparatus comprising:
a water tank for containing liquid;
a water-repellent particle layer located in the water tank and composed of water-repellent particles; and
a devolatilizing layer located below the water-repellent particle layer, and made of a plurality of particles to which water repellent treatment is not applied,
the method comprising steps of:
determining, by a liquid level controller, a surface level of the liquid introduced to the water tank in accordance with information on relationship between information corresponding to an amount of the liquid introduced to the water tank and a surface level of the liquid in the water tank;
adjusting, by an introduced amount controller, the amount of the liquid introduced to the water tank and then, placing a liquid on the water-repellent particle layer so as to be equal in level to the determined surface level of the liquid;
heating to evaporate the contained liquid into water vapor while a top of the water tank is covered with a lid; and
obtaining fresh water from the liquid by causing the water vapor to pass through the water-repellent particle layer, then reach the devolatilizing layer and be liquefied.

* * * * *